United States Patent
Xue et al.

(10) Patent No.: US 11,601,932 B2
(45) Date of Patent: *Mar. 7, 2023

(54) INFORMATION SENDING AND RECEIVING METHODS AND DEVICES

(71) Applicant: HUAWEI TECHNOLOGIES CO., LTD., Guangdong (CN)

(72) Inventors: Lixia Xue, Beijing (CN); Lei Guan, Beijing (CN); Qiang Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

This patent is subject to a terminal disclaimer.

(21) Appl. No.: 16/938,130

(22) Filed: Jul. 24, 2020

(65) Prior Publication Data

US 2021/0014842 A1 Jan. 14, 2021

Related U.S. Application Data

(63) Continuation of application No. 16/382,988, filed on Apr. 12, 2019, now Pat. No. 10,728,891, which is a (Continued)

(51) Int. Cl.
   *H04W 72/04* (2009.01)
   *H04W 72/044* (2023.01)
   *H04L 5/00* (2006.01)

(52) U.S. Cl.
   CPC ........... *H04W 72/044* (2013.01); *H04L 5/003* (2013.01); *H04L 5/0007* (2013.01)

(58) Field of Classification Search
   CPC .. H04W 72/044; H04W 16/10; H04L 5/0007; H04L 5/003; H04L 5/0044; H04L 5/0094
   See application file for complete search history.

(56) References Cited

U.S. PATENT DOCUMENTS

2010/0254288 A1   10/2010   Lim et al.
2011/0103290 A1   5/2011    Suzuki et al.
(Continued)

FOREIGN PATENT DOCUMENTS

CN   101594336 A   12/2009
CN   101882954     11/2010
(Continued)

OTHER PUBLICATIONS

Extended European Search Report issued in European Application No. 20213325.2 dated Jul. 19, 2021, 13 pages.
(Continued)

*Primary Examiner* — Jae Y Lee
(74) *Attorney, Agent, or Firm* — Fish & Richardson P.C.

(57) ABSTRACT

Embodiments of the present invention provide information sending and receiving methods and devices. The information sending method includes: determining, by a base station, a downlink subframe that is used to send first information to user equipment UE; and sending, by the base station, the first information to the UE by using the downlink subframe, where the downlink subframe is a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair. According to the embodiments of the present invention, an LTE communications system efficiently and flexibly supports various network architectures and various types of UEs.

24 Claims, 7 Drawing Sheets

Related U.S. Application Data continuation of application No. 15/015,430, filed on Feb. 4, 2016, now Pat. No. 10,278,170, which is a continuation of application No. PCT/CN2013/080978, filed on Aug. 7, 2013.

(56) References Cited

U.S. PATENT DOCUMENTS

| | | | |
|---|---|---|---|
| 2011/0317646 A1* | 12/2011 | Luo | H04W 72/0406 370/329 |
| 2011/0317657 A1 | 12/2011 | Chmiel et al. | |
| 2011/0319119 A1* | 12/2011 | Ishii | H04L 5/0066 455/522 |
| 2012/0113917 A1* | 5/2012 | Gaal | H04L 5/0058 370/329 |
| 2012/0195243 A1 | 8/2012 | Choi | |
| 2012/0287882 A1 | 11/2012 | Kim et al. | |
| 2012/0309403 A1 | 12/2012 | Mekhail et al. | |
| 2013/0064196 A1 | 3/2013 | Gao et al. | |
| 2013/0064216 A1 | 3/2013 | Gao et al. | |
| 2013/0294317 A1* | 11/2013 | Malladi | H04W 72/005 370/312 |
| 2014/0321399 A1 | 10/2014 | Liu et al. | |
| 2015/0139104 A1 | 5/2015 | Seo | |
| 2015/0319742 A1 | 11/2015 | Koivisto et al. | |
| 2016/0330734 A1 | 11/2016 | Kishiyama | |

FOREIGN PATENT DOCUMENTS

| | | | |
|---|---|---|---|
| CN | 102238732 A | 11/2011 | |
| CN | 102469059 A | 5/2012 | |
| CN | 102625457 A | 8/2012 | |
| CN | 102740330 | 10/2012 | |
| CN | 103026653 A | 4/2013 | |
| CN | 103200684 A | 7/2013 | |
| JP | 2012169821 A | 9/2012 | |
| JP | 2013009420 | 1/2013 | |
| JP | 2013507037 A | 2/2013 | |
| JP | 2013106144 | 5/2013 | |
| JP | 2013519247 | 5/2013 | |
| WO | 2008053342 | 5/2008 | |
| WO | 2011163201 A1 | 12/2011 | |
| WO | 2012061521 A1 | 5/2012 | |
| WO | 2013068832 A1 | 5/2013 | |
| WO | WO 2013/068832 * | 5/2013 | H04W 72/04 |
| WO | 2013104305 | 7/2013 | |

OTHER PUBLICATIONS

Office Action issued in Chinese Application No. 201380002004.7 dated Dec. 1, 2020, 7 pages.
Office Action issued in Chinese Application No. 202011569411.4 dated Aug. 25, 2021, 6 pages (with English translation).
Office Action issued in Japanese Application No. 2019-119986 dated Aug. 3, 2021, 15 pages (with English translation).
Office Action issued in Japanese Application No. 2019-119986 dated Oct. 6, 2020, 8 pages (with English translation).
"Technologies for Rel-12 and Onwards," 3GPP TSG RAN Workshop of Rel-12 and Onwards, RWS-120046, Samsung, Jun. 11-12, 2012, Ljublijana, Slovenia, 32 pages.
Extended European Search Report dated Jun. 23, 2016 in corresponding European Application No. 13891029.4.
Extended European Search Report issued in European Application No. 19153254.8 dated Oct. 11, 2019, 15 pages.
International Search Report dated May 13, 2014 in corresponding International Patent Application No. PCT/CN2013/080978.
International Search Report dated May 13, 2014 in corresponding International Applcation No. PT/CN2013/080978.
Japanese Office Action issued in Japanese Application No. 2018-028412 dated May 7, 2019, 15 pages (with English translation).
Multiplexing of E-PDCCH for BF Transmission, 3GPP RSG RAN WG1 Meeting #67, R1-113959, Nov. 14-18, 2011, San Francisco, USA, pp. 1-5.
Qiu et al., "An Efficient Diversity Exploitation in Multiuser Time-Varying Frequency-Selective Fading Channels," IEEE Transactions on Communications, vol. 59, No. 8, IEEE, Aug. 2011,pp. 2172-2184.
Office Action issued in Chinese Application No. 202011569563.4 dated Oct. 20, 2021, 5 pages.
Office Action issued in Japanese Application No. 2019-119986 dated Apr. 5, 2022, 7 pages (with English translation).
Office Action issued in Chinese Application No. 202011569563.4 dated Jun. 6, 2022, 5 pages.

* cited by examiner

INFORMATION SENDING AND RECEIVING METHODS AND DEVICES

CROSS-REFERENCE TO RELATED APPLICATIONS

This application is a continuation of U.S. patent application Ser. No. 16/382,988, filed on Apr. 12, 2019, which is a continuation of U.S. patent application Ser. No. 15/015,430, filed on Feb. 4, 2016, now U.S. Pat. No. 10,278,170, which is a continuation of International Patent Application No. PCT/CN2013/080978, filed on Aug. 7, 2013. All of the afore-mentioned patent applications are hereby incorporated by reference in their entireties.

TECHNICAL FIELD

Embodiments of the present invention relate to communications technologies, and in particular, to information sending and receiving methods and devices.

BACKGROUND

Currently, releases of a Long Term Evolution (LTE) communications system applied to a base station or user equipment (UE) include Release 8, Release 9, Release 10, Release 11, Release 12, and the like.

LTE communications systems of different releases are corresponding to different network architectures, for example, in a current LTE communications system, such as an LTE communications system of Release 8 or 9, deployment is performed mainly for a scenario in which there are homogeneous cells, that is, deployment is performed for a scenario in which a macro cell is mainly involved. A large quantity of heterogeneous networks are used for deployment in LTE communications systems starting from an LTE communications system of the Release 10, that is, deployment is performed by combining a macro cell and a micro cell. With development of the LTE communications systems, a channel propagation condition increasingly deteriorates, a large quantity of frequency spectrums of a high frequency band and even a super high frequency band will be used, such as 3.5 G Hertz, and even ten to tens of gigahertz. Under such a channel propagation condition, due to an increase in Doppler spread, a loss of a signal is great and interference between subcarriers increases.

For a UE, the UE can support one or more LTE systems, and to meet requirements of various communications application scenarios, UEs may further be classified into types of UEs according to specific functions of the UEs, for example, a UE used for processing a common data service or voice service, a machine-type UE used for processing data of a small amount, a UE used for processing a latency-sensitive service, and a UE used for receiving a broadcast service.

However, LTE communications systems of various releases in the prior art cannot efficiently and flexibly support multiple types of network architectures, cannot efficiently and flexibly support various channel propagation conditions, and cannot support multiple types of UEs.

SUMMARY

Embodiments of the present invention provide information sending and receiving methods and devices, so that an LTE communications system efficiently and flexibly supports various network architectures and various types of UEs.

According to a first aspect, an embodiment of the present invention provides an information sending method, including:

determining, by a base station, a downlink subframe that is used to send first information to user equipment UE; and sending, by the base station, the first information to the UE by using the downlink subframe, where the downlink subframe is a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

With reference to the first aspect, in a first possible implementation manner of the first aspect, a length of a time domain occupied by the sub-physical resource block pair is less than a length of a time domain occupied by the first subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

With reference to the first possible implementation manner of the first aspect, in a second possible implementation manner of the first aspect, a length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

With reference to the second possible implementation manner of the first aspect, in a third possible implementation manner of the first aspect, N1 is equal to N2, and M1 is equal to M2.

With reference to the second or the third possible implementation manner of the first aspect, in a fourth possible implementation manner of the first aspect, the at least one physical resource block pair in the third subframe occupies a first frequency band, and the at least one sub-physical resource block pair in the third subframe occupies a second frequency band, where the first frequency band and the second frequency band do not overlap.

With reference to the first aspect or any one of the first to the fourth possible implementation manners of the first aspect, in a fifth possible implementation manner of the first aspect, before the sending, by the base station, the first information to the UE by using the downlink subframe, the method further includes:

sending, by the base station, a subframe type indication to the UE, where the subframe type indication is used to indicate that the downlink subframe is the first subframe, the second subframe, or the third subframe.

With reference to the fourth or the fifth possible implementation manner of the first aspect, in a sixth possible implementation manner of the first aspect, when the downlink subframe is the third subframe, before the sending, by the base station, the first information to the UE by using the downlink subframe, the method further includes:

sending, by the base station, a frequency band indication to the UE, where the frequency band indication is used to indicate that the at least one physical resource block pair occupies the first frequency band, and the at least one sub-physical resource block pair occupies the second frequency band.

With reference to the sixth possible implementation manner of the first aspect, in a seventh possible implementation manner of the first aspect, the sending, by the base station, the first information to the UE by using the downlink subframe includes:

sending, by the base station, the physical resource block pair on the first frequency band to the UE by using a first cyclic prefix CP length, where the physical resource block pair on the first frequency band carries the first information; or sending, by the base station, the sub-physical resource block pair on the second frequency band to the UE by using a second CP length, where the sub-physical resource block pair on the second frequency band carries the first information, where the first CP length is different from the second CP length.

With reference to the first aspect or any one of the first to the seventh possible implementation manners of the first aspect, in an eighth possible implementation manner of the first aspect, the first information includes:

control information for scheduling a downlink data channel and downlink data carried by the downlink data channel; or control information for scheduling an uplink data channel.

With reference to the eighth possible implementation manner of the first aspect, in a ninth possible implementation manner of the first aspect, the control information for scheduling the downlink data channel includes a resource allocation indication of the downlink data channel, and the resource allocation indication of the downlink data channel is used to indicate a location of the physical resource block pair that is in the downlink subframe and that is allocated to the UE and a quantity of the physical resource block pairs, or the resource allocation indication of the downlink data channel is used to indicate a location of the sub-physical resource block pair that is in the downlink subframe and that is allocated to the UE and a quantity of the sub-physical resource block pairs; or the control information for scheduling the uplink data channel includes a resource allocation indication of the uplink data channel, and the resource allocation indication of the uplink data channel is used to indicate a location of a physical resource block pair that is in an uplink subframe and that is allocated to the UE and a quantity of the physical resource block pairs, or the resource allocation indication of the uplink data channel is used to indicate a location of the sub-physical resource block pair that is in an uplink subframe and that is allocated to the UE and a quantity of the sub-physical resource block pairs.

With reference to the ninth possible implementation manner of the first aspect, in a tenth possible implementation manner of the first aspect, the control information for scheduling the downlink data channel further includes a modulation and coding scheme, and the modulation and coding scheme is used to indicate a transport block size of the downlink data channel; or the control information for scheduling the uplink data channel further includes a modulation and coding scheme, and the modulation and coding scheme is used to indicate a transport block size of the uplink data channel.

According to a second aspect, an embodiment of the present invention provides an information receiving method, including:

determining, by user equipment UE, a downlink subframe that carries first information and that is sent by a base station; and receiving, by the UE, the first information by using the downlink subframe, where the downlink subframe is any one of a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

With reference to the second aspect, in a first possible implementation manner of the second aspect, a length of a time domain occupied by the sub-physical resource block pair is less than a length of a time domain occupied by the first subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

With reference to the first possible implementation manner of the second aspect, in a second possible implementation manner of the second aspect, a length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

With reference to the second possible implementation manner of the second aspect, in a third possible implementation manner of the second aspect, N1 is equal to N2, and M1 is equal to M2.

With reference to the second or the third possible implementation manner of the second aspect, in a fourth possible implementation manner of the second aspect, the at least one physical resource block pair in the third subframe occupies a first frequency band, and the at least one sub-physical resource block pair in the third subframe occupies a second frequency band, where the first frequency band and the second frequency band do not overlap.

With reference to the second aspect or any one of the first to the fourth possible implementation manners of the second aspect, in a fifth possible implementation manner of the second aspect, the determining, by a UE, a downlink subframe that carries first information and that is sent by a base station includes:

receiving, by the UE, a subframe type indication sent by the base station, where the subframe type indication is used to indicate that the downlink subframe is the first subframe, the second subframe, or the third subframe.

With reference to the fourth or the fifth possible implementation manner of the second aspect, in a sixth possible implementation manner of the second aspect, when the downlink subframe is the third subframe, before the receiving, by the UE, the first information by using the downlink subframe, the method further includes:

receiving, by the UE, a frequency band indication sent by the base station, where the frequency band indication is used to indicate that the at least one physical resource block pair occupies the first frequency band, and the at least one sub-physical resource block pair occupies the second frequency band.

With reference to the sixth possible implementation manner of the second aspect, in a seventh possible implementation manner of the second aspect, the receiving, by the UE, the first information by using the downlink subframe includes:

receiving, by the UE, the physical resource block pair that is on the first frequency band and that is sent by the base station by using a first cyclic prefix CP length, where the physical resource block pair on the first frequency band carries the first information; or receiving, by the UE, the sub-physical resource block pair that is on the second frequency band and that is sent by the base station by using a second CP length, where the sub-physical resource block pair on the second frequency band carries the first information, where the first CP length is different from the second CP length.

With reference to the second aspect or any one of the first to the seventh possible implementation manners of the second aspect, in an eighth possible implementation manner of the second aspect, the first information includes:

control information for scheduling a downlink data channel and downlink data carried by the downlink data channel; or control information for scheduling an uplink data channel.

With reference to the eighth possible implementation manner of the second aspect, in a ninth possible implementation manner of the second aspect, the control information for scheduling the downlink data channel includes a resource allocation indication of the downlink data channel, and the resource allocation indication of the downlink data channel is used to indicate a location of the physical resource block pair that is in the downlink subframe and that is allocated to the UE and a quantity of the physical resource block pairs, or the resource allocation indication of the downlink data channel is used to indicate a location of the sub-physical resource block pair that is in the downlink subframe and that is allocated to the UE and a quantity of the sub-physical resource block pairs; or the control information for scheduling the uplink data channel includes a resource allocation indication of the uplink data channel, and the resource allocation indication of the uplink data channel is used to indicate a location of a physical resource block pair that is in an uplink subframe and that is allocated to the UE and a quantity of the physical resource block pairs, or the resource allocation indication of the uplink data channel is used to indicate a location and a quantity of the sub-physical resource block pairs that is in an uplink subframe and that is allocated to the UE.

With reference to the ninth possible implementation manner of the second aspect, in a tenth possible implementation manner of the second aspect, the control information for scheduling the downlink data channel further includes a modulation and coding scheme, and the modulation and coding scheme is used to indicate a transport block size of the downlink data channel; or the control information for scheduling the uplink data channel further includes a modulation and coding scheme, and the modulation and coding scheme is used to indicate a transport block size of the uplink data channel.

According to a third aspect, an embodiment of the present invention provides an information sending method, including:

determining, by a base station, rate matching information, and sending the rate matching information to user equipment UE, where the rate matching information is used to indicate a first time-frequency resource that is in a downlink subframe and that does not need to be detected by the UE when the UE receives second information by using the downlink subframe; and determining, by the base station, the downlink subframe according to the rate matching information, and sending the downlink subframe to the user equipment, where the downlink subframe includes at least two subframes.

With reference to the third aspect, in a first possible implementation manner of the third aspect, the first time-frequency resource includes all time-frequency resources included in at least one subframe; or the first time-frequency resource includes at least one of a physical resource block, a sub-physical resource block, a physical resource block pair, and a sub-physical resource block pair; or the first time-frequency resource includes at least one of a resource element, a resource element group, and a control channel element; or the first time-frequency resource includes a resource pattern of a reference signal.

With reference to the first possible implementation manner of the third aspect, in a second possible implementation manner of the third aspect, a length of a time domain occupied by the sub-physical resource block pair is less than a length of a time domain occupied by one subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

With reference to the second possible implementation manner of the third aspect, in a third possible implementation manner of the third aspect, a length of a time domain occupied by the physical resource block pair is equal to a length of a time domain occupied by one subframe, and the physical resource block pair includes N2 second subcarriers and M2 second OFDM symbols, where a spacing between two adjacent second subcarriers in the frequency domain is equal to the set value, and both N2 and M2 are positive integers.

With reference to the third possible implementation manner of the third aspect, in a fourth possible implementation manner of the third aspect, N1 is equal to N2, and M1 is equal to M2.

With reference to the third or the fourth possible implementation manner of the third aspect, in a fifth possible implementation manner of the third aspect, the physical resource block pair occupies a first frequency band, and the sub-physical resource block pair occupies a second frequency band, where the first frequency band and the second frequency band do not overlap.

With reference to the third aspect or any one of the first to the fifth possible implementation manners of the third aspect, in a sixth possible implementation manner of the third aspect, the sending, by a base station, the rate matching information to user equipment UE includes:

sending, by the base station, the rate matching information to the UE by using layer 1 signaling or layer 2 signaling.

With reference to the third aspect or any one of the first to the sixth possible implementation manners of the third aspect, in a seventh possible implementation manner of the third aspect, a downlink subframe corresponding to the first time-frequency resource is a paging subframe or a synchronization signal sending subframe.

With reference to the third aspect or any one of the first to the seventh possible implementation manners of the third aspect, in an eighth possible implementation manner of the third aspect, the method further includes:

sending, by the base station, a configuration message to the UE, where the configuration message includes at least one of uplink scheduling information, uplink power control information, and periodic uplink signal configuration information, and the configuration message is used to instruct the UE to send an uplink signal in an uplink subframe according to the configuration message, where the uplink subframe is an uplink subframe corresponding to the downlink subframe in which the first time-frequency resource is located.

According to a fourth aspect, an embodiment of the present invention provides an information receiving method, including:

receiving, by user equipment UE, rate matching information sent by a base station, where the rate matching information is used to indicate a first time-frequency resource that is in a downlink subframe and that does not need to be detected by the UE when the UE receives second information by using the downlink subframe; and receiving, by the UE according to the rate matching information, the second information carried in the downlink subframe, where the downlink subframe includes at least two subframes.

With reference to the fourth aspect, in a first possible implementation manner of the fourth aspect, the first time-frequency resource includes all time-frequency resources included in at least one subframe; or the first time-frequency resource includes at least one of a physical resource block, a sub-physical resource block, a physical resource block pair, and a sub-physical resource block pair; or the first time-frequency resource includes at least one of a resource element, a resource element group, and a control channel element; or the first time-frequency resource includes a resource pattern of a reference signal.

With reference to the first possible implementation manner of the fourth aspect, in a second possible implementation manner of the fourth aspect, a length of a time domain occupied by the sub-physical resource block pair is less than a length of a time domain occupied by one subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

With reference to the second possible implementation manner of the fourth aspect, in a third possible implementation manner of the fourth aspect, a length of a time domain occupied by the physical resource block pair is equal to a length of a time domain occupied by one subframe, and the physical resource block pair includes N2 second subcarriers and M2 second OFDM symbols, where a spacing between two adjacent second subcarriers in the frequency domain is equal to the set value, and both N2 and M2 are positive integers.

With reference to the third possible implementation manner of the fourth aspect, in a fourth possible implementation manner of the fourth aspect, N1 is equal to N2, and M1 is equal to M2.

With reference to the third or the fourth possible implementation manner of the fourth aspect, in a fifth possible implementation manner of the fourth aspect, the physical resource block pair occupies a first frequency band, and the sub-physical resource block pair occupies a second frequency band, where the first frequency band and the second frequency band do not overlap.

With reference to the fourth aspect or any one of the first to the fifth possible implementation manners of the fourth aspect, in a sixth possible implementation manner of the fourth aspect, the receiving, by user equipment UE, rate matching information sent by a base station includes:

receiving, by the UE by using layer 1 signaling or layer 2 signaling, the rate matching information sent by the base station.

With reference to the fourth aspect or any one of the first to the sixth possible implementation manners of the fourth aspect, in a seventh possible implementation manner of the fourth aspect, a downlink subframe corresponding to the first time-frequency resource is a paging subframe or a synchronization signal sending subframe.

With reference to the fourth aspect or any one of the first to the seventh possible implementation manners of the fourth aspect, in an eighth possible implementation manner of the fourth aspect, the method further includes:

receiving, by the UE, a configuration message sent by the base station, where the configuration message includes at least one of uplink scheduling information, uplink power control information, and periodic uplink signal configuration information; and sending, by the UE, an uplink signal in an uplink subframe according to the configuration message, where the uplink subframe is an uplink subframe corresponding to the downlink subframe in which the first time-frequency resource is located.

According to a fifth aspect, an embodiment of the present invention provides a base station, including:

a subframe determining module, configured to determine a downlink subframe that is used to send first information to user equipment UE; and a first sending module, configured to send the first information to the UE by using the downlink subframe, where the downlink subframe is a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

With reference to the fifth aspect, in a first possible implementation manner of the fifth aspect, a length of a time domain occupied by the sub-physical resource block pair is less than a length of a time domain occupied by the first subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

With reference to the first possible implementation manner of the fifth aspect, in a second possible implementation manner of the fifth aspect, a length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

With reference to the second possible implementation manner of the fifth aspect, in a third possible implementation manner of the fifth aspect, N1 is equal to N2, and M1 is equal to M2.

With reference to the second or the third possible implementation manner of the fifth aspect, in a fourth possible implementation manner of the fifth aspect, the at least one physical resource block pair in the third subframe occupies a first frequency band, and the at least one sub-physical resource block pair in the third subframe occupies a second frequency band, where the first frequency band and the second frequency band do not overlap.

With reference to the fifth aspect or any one of the first to fourth possible implementation manners of the fifth aspect, in a fifth possible implementation manner of the fifth aspect, the base station further includes:

a second sending module, configured to send a subframe type indication to the UE before the first information is sent to the UE by using the downlink subframe, where the subframe type indication is used to indicate that the downlink subframe is the first subframe, the second subframe, or the third subframe.

With reference to the fourth or the fifth possible implementation manner of the fifth aspect, in a sixth possible implementation manner of the fifth aspect, the base station further includes:

a third sending module, configured to: when the downlink subframe is the third subframe, send a frequency band indication to the UE before the first information is sent to the UE by using the downlink subframe, where the frequency band indication is used to indicate that the at least one physical resource block pair occupies the first frequency band, and the at least one sub-physical resource block pair occupies the second frequency band.

With reference to the sixth possible implementation manner of the fifth aspect, in a seventh possible implementation manner of the fifth aspect, the first sending module is specifically configured to:

send the physical resource block pair on the first frequency band to the UE by using a first cyclic prefix CP length, where the physical resource block pair on the first frequency band carries the first information; or send the sub-physical resource block pair on the second frequency band to the UE by using a second CP length, where the sub-physical resource block pair on the second frequency band carries the first information, where the first CP length is different from the second CP length.

With reference to the fifth aspect or any one of the first to the seventh possible implementation manners of the fifth aspect, in an eighth possible implementation manner of the fifth aspect, the first information includes:

control information for scheduling a downlink data channel and downlink data carried by the downlink data channel; or control information for scheduling an uplink data channel.

With reference to the eighth possible implementation manner of the fifth aspect, in a ninth possible implementation manner of the fifth aspect, the control information for scheduling the downlink data channel includes a resource allocation indication of the downlink data channel, and the resource allocation indication of the downlink data channel is used to indicate a location of the physical resource block pair that is in the downlink subframe and that is allocated to the UE and a quantity of the physical resource block pairs, or the resource allocation indication of the downlink data channel is used to indicate a location of the sub-physical resource block pair that is in the downlink subframe and that is allocated to the UE and a quantity of the sub-physical resource block pairs; or the control information for scheduling the uplink data channel includes a resource allocation indication of the uplink data channel, and the resource allocation indication of the uplink data channel is used to indicate a location of a physical resource block pair that is in an uplink subframe and that is allocated to the UE and a quantity of the physical resource block pairs, or the resource allocation indication of the uplink data channel is used to indicate a location of the sub-physical resource block pair that is in an uplink subframe and that is allocated to the UE and a quantity of the sub-physical resource block pairs.

With reference to the ninth possible implementation manner of the fifth aspect, in a tenth possible implementation manner of the fifth aspect, the control information for scheduling the downlink data channel further includes a modulation and coding scheme, and the modulation and coding scheme is used to indicate a transport block size of the downlink data channel; or the control information for scheduling the uplink data channel further includes a modulation and coding scheme, and the modulation and coding scheme is used to indicate a transport block size of the uplink data channel.

According to a sixth aspect, an embodiment of the present invention provides user equipment, including:

a subframe determining module, configured to determine a downlink subframe that carries first information and that is sent by a base station; and a first receiving module, configured to receive the first information by using the downlink subframe, where the downlink subframe is any one of a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

With reference to the sixth aspect, in a first possible implementation manner of the sixth aspect, a length of a time domain occupied by the sub-physical resource block pair is less than a length of a time domain occupied by the first subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

With reference to the first possible implementation manner of the sixth aspect, in a second possible implementation manner of the sixth aspect, a length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

With reference to the second possible implementation manner of the sixth aspect, in a third possible implementation manner of the sixth aspect, N1 is equal to N2, and M1 is equal to M2.

With reference to the second or the third possible implementation manner of the sixth aspect, in a fourth possible implementation manner of the sixth aspect, the at least one physical resource block pair in the third subframe occupies a first frequency band, and the at least one sub-physical resource block pair in the third subframe occupies a second frequency band, where the first frequency band and the second frequency band do not overlap.

With reference to the sixth aspect or any one of the first to the fourth possible implementation manners of the sixth aspect, in a fifth possible implementation manner of the sixth aspect, the subframe determining module is specifically configured to:

receive a subframe type indication sent by the base station, where the subframe type indication is used to indicate that the downlink subframe is the first subframe, the second subframe, or the third subframe.

With reference to the fourth or the fifth possible implementation manners of the sixth aspect, in a sixth possible implementation manner of the sixth aspect, the user equipment further includes a second receiving module, configured to: when the downlink subframe is the third subframe and before the first information is received by using the downlink subframe, receive a frequency band indication sent by the base station, where the frequency band indication is used to indicate that the at least one physical resource block pair occupies the first frequency band, and the at least one sub-physical resource block pair occupies the second frequency band.

With reference to the sixth possible implementation manner of the sixth aspect, in a seventh possible implementation manner of the sixth aspect, the first receiving module is specifically configured to:

receive the physical resource block pair that is on the first frequency band and that is sent by the base station by using a first cyclic prefix CP length, where the physical resource block pair on the first frequency band carries the first information; or receive the sub-physical resource block pair that is on the second frequency band and that is sent by the base station by using a second CP length, where the sub-physical resource block pair on the second frequency band carries the first information, where the first CP length is different from the second CP length.

With reference to the sixth aspect or any one of the first to the seventh possible implementation manners of the sixth aspect, in an eighth possible implementation manner of the sixth aspect, the first information includes:

control information for scheduling a downlink data channel and downlink data carried by the downlink data channel; or control information for scheduling an uplink data channel.

With reference to the eighth possible implementation manner of the sixth aspect, in a ninth possible implementation manner of the sixth aspect, the control information for scheduling the downlink data channel includes a resource allocation indication of the downlink data channel, and the resource allocation indication of the downlink data channel is used to indicate a location of the physical resource block pair that is in the downlink subframe and that is allocated to the UE and a quantity of the physical resource block pairs, or the resource allocation indication of the downlink data channel is used to indicate a location of the sub-physical resource block pair that is in the downlink subframe and that is allocated to the UE and a quantity of the sub-physical resource block pairs; or the control information for scheduling the uplink data channel includes a resource allocation indication of the uplink data channel, and the resource allocation indication of the uplink data channel is used to indicate a location of a physical resource block pair that is in an uplink subframe and that is allocated to the UE and a quantity of the physical resource block pairs, or the resource allocation indication of the uplink data channel is used to indicate a location and a quantity of the sub-physical resource block pairs that is in an uplink subframe and that is allocated to the UE.

With reference to the ninth possible implementation manner of the sixth aspect, in a tenth possible implementation manner of the sixth aspect, the control information for scheduling the downlink data channel further includes a modulation and coding scheme, and the modulation and coding scheme is used to indicate a transport block size of the downlink data channel; or the control information for scheduling the uplink data channel further includes a modulation and coding scheme, and the modulation and coding scheme is used to indicate a transport block size of the uplink data channel.

According to a seventh aspect, an embodiment of the present invention provides a base station, including:

an information determining module, configured to determine rate matching information, and send the rate matching information to user equipment UE, where the rate matching information is used to indicate a first time-frequency resource that is in a downlink subframe and that does not need to be detected by the UE when the UE receives second information by using the downlink subframe; and a first sending module, configured to determine the downlink subframe according to the rate matching information, and send the downlink subframe to the user equipment, where the downlink subframe includes at least two subframes.

With reference to the seventh aspect, in a first possible implementation manner of the seventh aspect, the first time-frequency resource includes all time-frequency resources included in at least one subframe; or the first time-frequency resource includes at least one of a physical resource block, a sub-physical resource block, a physical resource block pair, and a sub-physical resource block pair; or the first time-frequency resource includes at least one of a resource element, a resource element group, and a control channel element; or the first time-frequency resource includes a resource pattern of a reference signal.

With reference to the first possible implementation manner of the seventh aspect, in a second possible implementation manner of the seventh aspect, a length of a time domain occupied by the sub-physical resource block pair is less than a length of a time domain occupied by one subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

With reference to the second possible implementation manner of the seventh aspect, in a third possible implementation manner of the seventh aspect, a length of a time domain occupied by the physical resource block pair is equal to a length of a time domain occupied by one subframe, and the physical resource block pair includes N2 second subcarriers and M2 second OFDM symbols, where a spacing between two adjacent second subcarriers in the frequency domain is equal to the set value, and both N2 and M2 are positive integers.

With reference to the third possible implementation manner of the seventh aspect, in a fourth possible implementation manner of the seventh aspect, N1 is equal to N2, and M1 is equal to M2.

With reference to the third or the fourth possible implementation manner of the seventh aspect, in a fifth possible implementation manner of the seventh aspect, the physical resource block pair occupies a first frequency band, and the sub-physical resource block pair occupies a second frequency band, where the first frequency band and the second frequency band do not overlap.

With reference to the seventh aspect or any one of the first to the fifth possible implementation manners of the seventh aspect, in a sixth possible implementation manner of the seventh aspect, the first sending module is specifically configured to:

send the rate matching information to the UE by using layer 1 signaling or layer 2 signaling.

With reference to the seventh aspect or any one of the first to the sixth possible implementation manners of the seventh aspect, in a seventh possible implementation manner of the seventh aspect, a downlink subframe corresponding to the first time-frequency resource is a paging subframe or a synchronization signal sending subframe.

With reference to the seventh aspect or any one of the first to seventh possible implementation manners of the seventh aspect, in an eighth possible implementation manner of the seventh aspect, the base station further includes:

a configuration module, configured to send a configuration message to the UE, where the configuration message includes at least one of uplink scheduling information, uplink power control information, and periodic uplink signal configuration information, and the configuration message is used to instruct the UE to send an uplink signal in an uplink subframe according to the configuration message, where the uplink subframe is an uplink subframe corresponding to the downlink subframe in which the first time-frequency resource is located.

According to an eighth aspect, an embodiment of the present invention provides user equipment, including:

a first receiving module, configured to receive rate matching information sent by a base station, where the rate matching information is used to indicate a first time-frequency resource that is in a downlink subframe and that does not need to be detected by the UE when the UE receives second information by using the downlink subframe; and a second receiving module, configured to receive, according to the rate matching information, the second information carried in the downlink subframe, where the downlink subframe includes at least two subframes.

With reference to the eighth aspect, in a first possible implementation manner of the eighth aspect, the first time-frequency resource includes all time-frequency resources included in at least one subframe; or the first time-frequency resource includes at least one of a physical resource block, a sub-physical resource block, a physical resource block pair, and a sub-physical resource block pair; or the first time-frequency resource includes at least one of a resource element, a resource element group, and a control channel element; or the first time-frequency resource includes a resource pattern of a reference signal.

With reference to the first possible implementation manner of the eighth aspect, in a second possible implementation manner of the eighth aspect, a length of a time domain occupied by the sub-physical resource block pair is less than a length of a time domain occupied by one subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

With reference to the second possible implementation manner of the eighth aspect, in a third possible implementation manner of the eighth aspect, a length of a time domain occupied by the physical resource block pair is equal to a length of a time domain occupied by one subframe, and the physical resource block pair includes N2 second subcarriers and M2 second OFDM symbols, where a spacing between two adjacent second subcarriers in the frequency domain is equal to the set value, and both N2 and M2 are positive integers.

With reference to the third possible implementation manner of the eighth aspect, in a fourth possible implementation manner of the eighth aspect, N1 is equal to N2, and M1 is equal to M2.

With reference to the third or the fourth possible implementation manner of the eighth aspect, in a fifth possible implementation manner of the eighth aspect, the physical resource block pair occupies a first frequency band, and the sub-physical resource block pair occupies a second frequency band, where the first frequency band and the second frequency band do not overlap.

With reference to the eighth aspect or any one of the first to the fifth possible implementation manners of the eighth aspect, in a sixth possible implementation manner of the eighth aspect, the first receiving module is specifically configured to:

receive, by using layer 1 signaling or layer 2 signaling, the rate matching information sent by the base station.

With reference to the eighth aspect or any one of the first to the sixth possible implementation manners of the eighth aspect, in a seventh possible implementation manner of the eighth aspect, a downlink subframe corresponding to the first time-frequency resource is a paging subframe or a synchronization signal sending subframe.

With reference to the eighth aspect or any one of the first to seventh possible implementation manners of the eighth aspect, in an eighth possible implementation manner of the eighth aspect, the user equipment further includes:

a third receiving module, configured to receive a configuration message sent by the base station, where the configuration message includes at least one of uplink scheduling information, uplink power control information, and periodic uplink signal configuration information; and a sending module, configured to send an uplink signal in an uplink subframe according to the configuration message, where the uplink subframe is an uplink subframe corresponding to the downlink subframe in which the first time-frequency resource is located.

According to the information sending and receiving methods and devices provided in the embodiments of the present invention, a base station determines a downlink subframe that is used to send first information to user equipment, and the base station sends the first information to the UE by using the downlink subframe, where the downlink subframe is a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair, so that an LTE communications system can efficiently and flexibly support various network architectures and various types of UEs.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
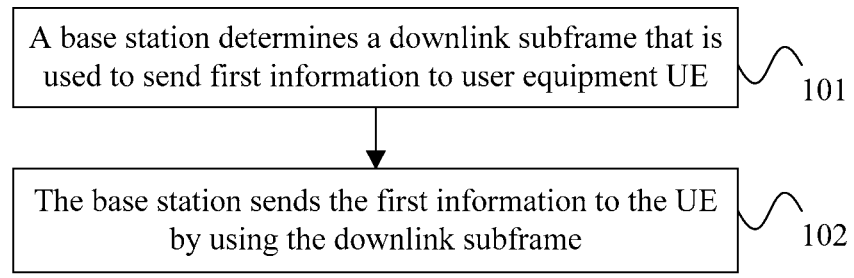
FIG. 1 is a flowchart of Embodiment 1 of an information sending method according to the present invention.

FIG. 1 is a flowchart of Embodiment 1 of an information sending method according to the present invention. As shown in FIG. 1, the information sending method provided in this embodiment of the present invention may be executed by a base station. The base station may be implemented by using software and/or hardware. The information sending method provided in this embodiment includes the following steps:

Step 101: The base station determines a downlink subframe that is used to send first information to user equipment UE.

Step 102: The base station sends the first information to the UE by using the downlink subframe.

The downlink subframe is any one of a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

LTE communications systems of different releases are corresponding to different network architectures, for example, in a current LTE communications system, such as an LTE communications system of Release 8 or 9, deployment is performed mainly for a scenario in which there are homogeneous cells, that is, deployment is performed for a scenario in which a macro cell is mainly involved. A coverage area of a macro cell is relatively large, and therefore, from a perspective of statistics, a quantity of UEs served in each time period or even at each moment is relatively stable; deployment of the homogeneous cells may meet a frequency selective scheduling gain and a multi-user scheduling gain, and specific cyclic prefix (CP) overheads are maintained to resist a multipath effect.

Starting from an LTE communications system of Release 10, particularly, in an LTE communications system of Release 12 that is currently being standardized or even a future LTE system, a large quantity of heterogeneous networks are deployed, that is, deployment is performed by combining a macro cell and a micro cell, and deployment density of micro cells in a macro cell is increasingly high, so as to improve a high data rate anywhere at any time. The macro cell is mainly used for maintaining coverage, radio resource control, and mobility performance. In addition, many future frequency spectrums are high frequency bands, such as 3.5 GHz or even a higher frequency band, and the high frequency bands can provide higher bandwidth. In a mainstream deployment scenario, inter-frequency deployment of macro and micro cells is used to reduce interference between the macro and micro cells, and intra-frequency deployment of macro and micro cells may also be considered to improve frequency spectrum utilization.

Therefore, in step 101, the base station needs to determine, according to an LTE release supported by the base station, a communications system architecture, or an LTE release supported by the UE, the downlink subframe that is used to send the first information to the UE. Optionally, the first information sent by the base station to the UE includes control information for scheduling a downlink data channel and downlink data carried by the downlink data channel, or control information for scheduling an uplink data channel.

In step 102, the base station sends the first information to the UE by using the downlink subframe. The base station adds data and control information to the downlink subframe, so that the UE acquires corresponding information.

Specifically, the downlink subframe in this embodiment is any one of the first subframe, the second subframe, or the third subframe.

The first subframe includes at least two sub-physical resource block pairs, the second subframe includes at least two physical resource block pairs, and the third subframe includes at least one sub-physical resource block pair and at least one physical resource block pair.

A length of a time domain occupied by the sub-physical resource block pair is less than a length of a time domain occupied by the first subframe, and the sub-physical resource block pair includes N1 first subcarriers and M1 first orthogonal frequency division multiplexing (OFDM) symbols, where a spacing between two adjacent first subcarriers in a frequency domain is greater than a set value, and both N1 and M1 are positive integers.

A length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

Optionally, N1 is equal to N2, and M1 is equal to M2.

Optionally, the foregoing set value may be 15 KHz, 7.5 KHz, or the like.

Figure 2:
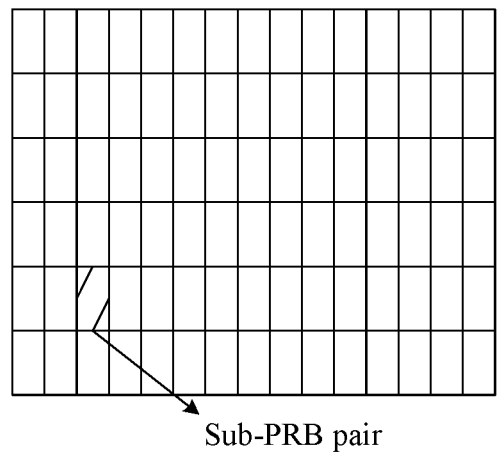
FIG. 2 is a schematic structural diagram of a first subframe according to an embodiment of the present invention.

FIG. 2 is a schematic structural diagram of a first subframe according to an embodiment of the present invention. In an LTE communications system, one radio frame includes 10 subframes, and a length of a time domain of each subframe is 1 ms. The first subframe is a newly introduced subframe whose length is also 1 ms and whose time-frequency domain includes multiple sub-physical resource block (RB) pairs, where a length of a time domain occupied by each sub-physical resource block pair is less than a length of a time domain of one subframe. For example, in FIG. 2, a subframe of a first type includes six sub-physical resource block pairs in terms of a frequency domain width, and includes 15 sub-physical resource block pairs (the 15 sub-physical resource block pairs occupy the length of the time domain of one subframe) in terms of a time domain length, that is, the sub-physical resource block pair is a sub-physical resource block pair in two dimensions: a time domain and a frequency domain. Each sub-physical resource block pair includes 12 subcarriers in the frequency domain, and includes 14 OFDM symbols in the time domain. A spacing between two adjacent subcarriers of the subframe of the first type is 250 KHz, and a symbol time is 4 microseconds, which is far less than 66.67 microseconds, while a CP length is reduced to 0.76 nanosecond.

Persons skilled in the art may understand that, in a specific implementation process, quantities of sub-physical resource block pairs in terms of a frequency domain width and a time domain length are not specifically limited in this embodiment as long as a length of a time domain occupied by each sub-physical resource block pair is less than a length of a time domain of a subframe.

Figure 3:
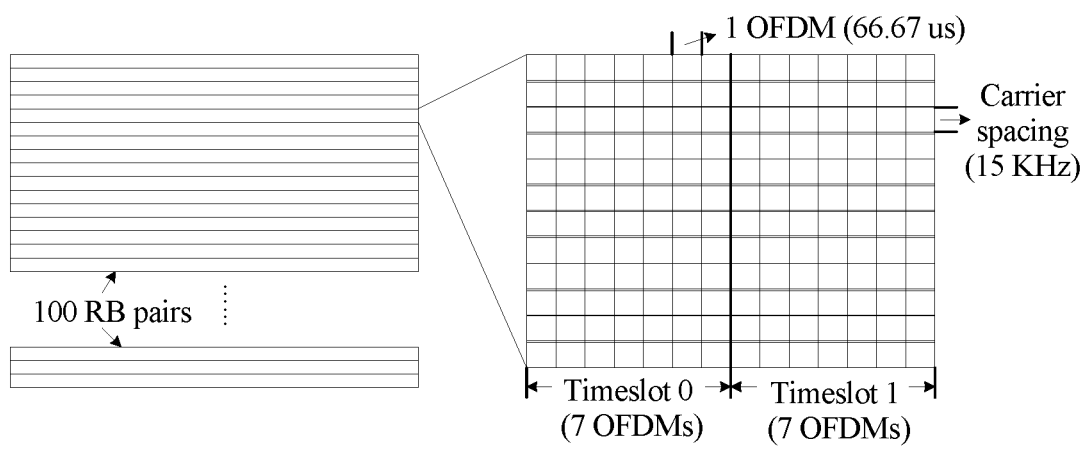
FIG. 3 is a schematic structural diagram of a second subframe according to an embodiment of the present invention.

FIG. 3 is a schematic structural diagram of a second subframe according to an embodiment of the present invention. The second subframe includes multiple physical resource block pairs in a frequency domain, and each physical resource block pair occupies a length of a time domain of an entire subframe. As shown in FIG. 3, the second subframe includes 100 physical resource block pairs in terms of a frequency domain width, and each physical resource block includes two timeslots. For a normal CP, one timeslot includes seven OFDM symbols, and a length of a time domain of each OFDM symbol is 66.67 microseconds; for an extended CP, one timeslot includes six symbols, where a length of the normal CP is approximately 5 microseconds, and a length of the extended CP is approximately 16 microseconds. As shown in FIG. 3, a physical resource block pair (RB pair) includes a timeslot 0 and a timeslot 1, and each timeslot includes seven OFDM symbols. The physical resource block pair occupies 12 OFDM subcarriers in a frequency domain, where a spacing between subcarriers is 15 KHz, and duration of an OFDM symbol is 1/(15 KHz)=66.67 microseconds.

It can be learned from embodiments shown in FIG. 2 and FIG. 3 that, a quantity of transportable resource elements (12 subcarriers, 14 OFDM symbols) in a sub-physical resource block pair is the same as that in a physical resource block pair, but duration of an OFDM symbol is greatly reduced, a CP length is greatly reduced, and a spacing between subcarriers is significantly increased, which is more suitable for deployment of dense micro cells at a high frequency band. Specifically, an increase in the spacing between the subcarriers may resist larger Doppler spread; a decrease of the CP length has little impact on deployment of micro cells, but overheads are reduced; a decrease of the duration of the OFDM symbol may increase a service delay, which is beneficial to a sensitive service, and the decrease of the duration of the OFDM symbol is also beneficial to interference coordination and improvement of network power efficiency. Specifically, compared with a structure of a physical resource block, a structure of a sub-physical resource block pair can be used to rapidly complete transmission of a same amount of data, because a minimum time scheduling granularity of the sub-physical resource block pair is far less than 1 ms. In this way, the micro cells can complete more services to enter a sleeping state or a closed state, and implement inter-cell interference coordination in a time division manner.

The third subframe includes the at least one sub-physical resource block pair and the at least one physical resource block pair. For a structure of the sub-physical resource block pair in the third subframe, refer to FIG. 2; for a structure of the physical resource block pair in the third subframe, refer to FIG. 3.

Optionally, the at least one physical resource block pair in the third subframe occupies a first frequency band, and the at least one sub-physical resource block pair in the third subframe occupies a second frequency band, where the first frequency band and the second frequency band do not overlap.

Specifically, in the third subframe, the physical resource block pair and the sub-physical resource block pair coexist and undergo multiplexing by means of orthogonal frequency division, that is, the physical resource block pair in the third subframe occupies the first frequency band, and the sub-physical resource block pair in the third subframe occupies the second frequency band, where the first frequency band and the second frequency band do not overlap.

According to the information sending method provided in this embodiment of the present invention, a base station determines a downlink subframe that is used to send information to user equipment, and the base station sends the first information to the UE by using the downlink subframe, where the downlink subframe is a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair, so that an LTE communications system can efficiently and flexibly support various network architectures and various types of UEs.

Figure 4:
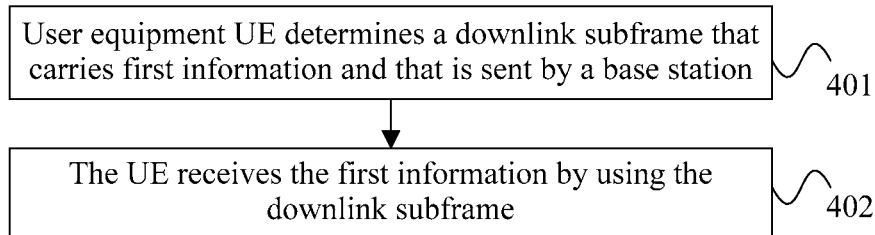
FIG. 4 is a flowchart of Embodiment 1 of an information receiving method according to the present invention.

FIG. 4 is a flowchart of Embodiment 1 of an information receiving method according to the present invention. As shown in FIG. 4, the information receiving method provided in this embodiment of the present invention may be executed by user equipment. The user equipment may be implemented by using software and/or hardware. The information receiving method provided in this embodiment includes the following steps:

Step 401: The user equipment UE determines a downlink subframe that carries first information and that is sent by a base station.

Step 402: The UE receives the first information by using the downlink subframe.

The downlink subframe is any one of a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

A length of a time domain occupied by the sub-physical resource block pair is less than a length of a time domain occupied by the first subframe, and the sub-physical resource block pair includes N1 first subcarriers and M1 first OFDM symbols, where a spacing between two adjacent first subcarriers in a frequency domain is greater than a set value, and both N1 and M1 are positive integers.

A length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

N1 is equal to N2, and M1 is equal to M2.

Optionally, the foregoing set value may be 15 KHz, 7.5 KHz, or the like.

The at least one physical resource block pair in the third subframe occupies a first frequency band, and the at least one sub-physical resource block pair in the third subframe occupies a second frequency band, where the first frequency band and the second frequency band do not overlap.

An application scenario of this embodiment is similar to that of the embodiment shown in FIG. 1, and details are not described herein again in this embodiment. In step 401, the UE determines the downlink subframe that carries the first information and that is sent by the base station. Specifically, the UE receives a subframe type indication sent by the base station, where the subframe type indication is used to indicate that the downlink subframe is the first subframe, the second subframe, or the third subframe. In step 402, the UE receives the first information by using the downlink subframe, where the first information includes control information for scheduling a downlink data channel and downlink data carried by the downlink data channel; or control information for scheduling an uplink data channel.

For a structure of the first subframe, refer to the embodiment shown in FIG. 2; details are not described herein again in this embodiment. For a structure of the second subframe, refer to the embodiment shown in FIG. 3; details are not described herein again in this embodiment. The third subframe includes at least one sub-physical resource block pair and at least one physical resource block pair. For a structure of the sub-physical resource block pair in the third subframe, refer to FIG. 2; for a structure of the physical resource block pair in the third subframe, refer to FIG. 3; details are not described herein again in this embodiment.

According to the information receiving method provided in this embodiment of the present invention, a UE determines a downlink subframe that carries first information and that is sent by a base station, and the UE receives the first information by using the downlink subframe, where the downlink subframe is any one of a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair, so that an LTE communications system can efficiently and flexibly support various network architectures and various types of UEs.

Figure 5:
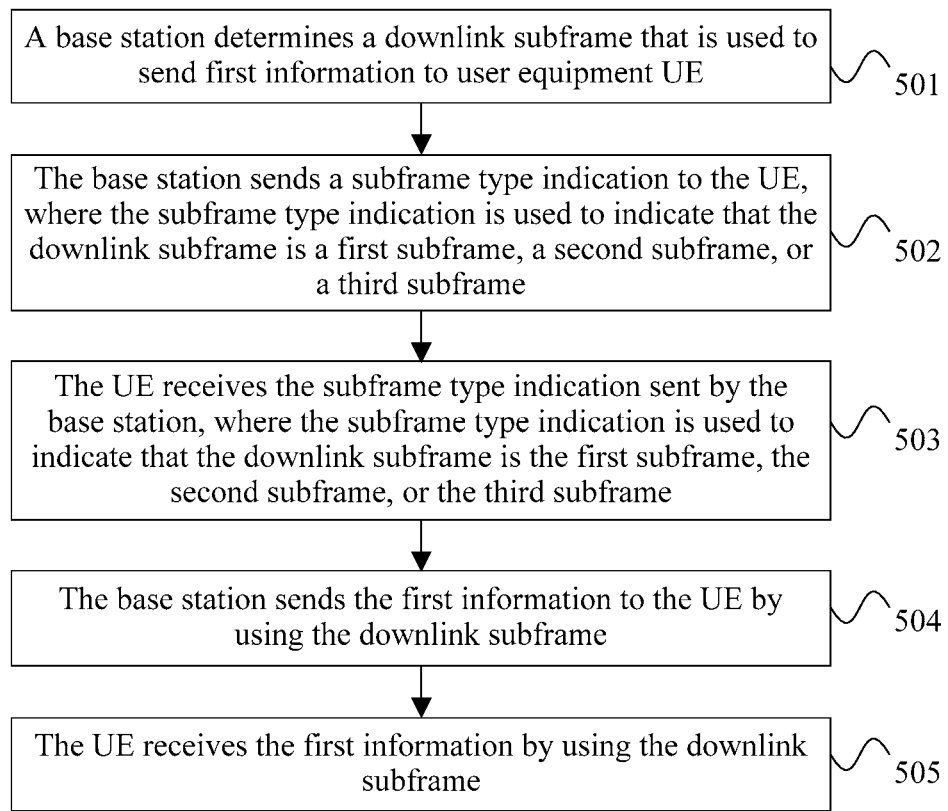
FIG. 5 is a flowchart of Embodiment 1 of an information sending and receiving method according to an embodiment of the present invention.

FIG. 5 is a flowchart of Embodiment 1 of an information sending and receiving method according to an embodiment of the present invention. In this embodiment, the information sending and receiving method of the present invention is described in detail based on the embodiments shown in FIG. 1 to FIG. 4.

Step 501: A base station determines a downlink subframe that is used to send first information to user equipment UE.

Step 502: The base station sends a subframe type indication to the UE, where the subframe type indication is used to indicate that the downlink subframe is a first subframe, a second subframe, or a third subframe.

Step 503: The UE receives the subframe type indication sent by the base station, where the subframe type indication is used to indicate that the downlink subframe is the first subframe, the second subframe, or the third subframe.

Step 504: The base station sends the first information to the UE by using the downlink subframe.

Step 505: The UE receives the first information by using the downlink subframe.

In this embodiment, step 501 is similar to step 101, and details are not described herein again in this embodiment.

In step 502 and step 503, the base station sends the subframe type indication to the UE, and the UE receives the subframe type indication, where the subframe type indication is used to indicate that the downlink subframe is the first subframe, the second subframe, or the third subframe. Persons skilled in the art may understand that, in a specific implementation process, the base station and the UE may be preconfigured, so that the base station and the UE prestore a specific subframe structure of the first subframe, the second subframe, or the third subframe. When the base station sends the subframe type indication to the UE, the UE determines, according to the subframe type indication, that the subframe is specifically the first subframe, the second subframe, or the third subframe, and then receives, in a corresponding subframe according to a structure of the subframe, information sent by the base station.

Optionally, when the downlink subframe is the third subframe, before step 504, the method provided in this embodiment further includes:

sending, by the base station, a frequency band indication to the UE, where the frequency band indication is used to indicate that at least one physical resource block pair occupies a first frequency band, and at least one sub-physical resource block pair occupies a second frequency band; and receiving, by the UE, the frequency band indication sent by the base station, where the frequency band indication is used to indicate that the at least one physical resource block pair occupies the first frequency band, and the at least one sub-physical resource block pair occupies the second frequency band.

Correspondingly, step 504 may be implemented in the following possible implementation manner: sending, by the base station, the physical resource block pair on the first frequency band to the UE by using a first cyclic prefix CP length, where the physical resource block pair on the first frequency band carries the first information; or sending, by the base station, the sub-physical resource block pair on the second frequency band to the UE by using a second CP length, where the sub-physical resource block pair on the second frequency band carries the first information.

Correspondingly, step 505 may be implemented in the following possible implementation manner: receiving, by the UE, the physical resource block pair that is on the first frequency band and that is sent by the base station by using the first cyclic prefix CP length, where the physical resource block pair on the first frequency band carries the first information; or receiving, by the UE, the sub-physical resource block pair that is on the second frequency band and that is sent by the base station by using the second CP length, where the sub-physical resource block pair on the second frequency band carries the first information, where the UE receives the physical resource block pair that is on the first frequency band and that is sent by the base station by using the first CP length, and the UE receives the sub-physical resource block pair that is on the second frequency band and that is sent by the base station by using the second CP length, where the first CP length is different from the second CP length.

In a specific implementation process, the base station sends the sub-physical resource block pair and the physical resource block pair in a frequency division multiplexing manner, and the UE receives reference signals with a same configuration on a frequency band. For example, the UE receives, on a frequency band of the physical resource block pair, a reference signal used for measurement, such as a cell-specific reference signal CRS or a channel state information-reference signal CSI-RS; and receives a broadcast signal on a frequency band of the sub-physical resource block pair, so that measurement steps are simplified, and the UE does not need to separately receive reference signals with different configurations on two frequency bands.

In addition, the physical resource block pair and the sub-physical resource block pair undergo multiplexing on a carrier, or undergo frequency division multiplexing in a same subframe, which can improve flexibility, for example, supporting different service types, for example, a first frequency band is used for multicast service transmission, and an extended CP is used; a second frequency band is used for a unicast service transmission, and a normal CP is used.

Optionally, on a basis of the embodiments shown in FIG. 1 to FIG. 5, the first information includes control information for scheduling a downlink data channel and downlink data carried by the downlink data channel, or control information for scheduling an uplink data channel.

The control information for scheduling the downlink data channel includes a resource allocation indication of the downlink data channel, where the resource allocation indication of the downlink data channel is used to indicate a location of the physical resource block pair that is in the downlink subframe and that is allocated to the UE and a quantity of the physical resource block pairs, or the resource allocation indication of the downlink data channel is used to indicate a location of the sub-physical resource block pair that is in the downlink subframe and that is allocated to the UE and a quantity of the sub-physical resource block pairs.

Alternatively, the control information for scheduling the uplink data channel includes a resource allocation indication of the uplink data channel, where the resource allocation indication of the uplink data channel is used to indicate a location of a physical resource block pair that is in an uplink subframe and that is allocated to the UE and a quantity of the physical resource block pairs, or the resource allocation indication of the uplink data channel is used to indicate a location of the sub-physical resource block pair that is in an uplink subframe and that is allocated to the UE and a quantity of the sub-physical resource block pairs.

Specifically, the control information for scheduling the downlink data channel and the control information for scheduling the uplink data channel may be collectively referred to as control information, and the downlink data channel and the uplink data channel may be collectively referred to as a data channel. Persons skilled in the art may understand that, for the control information, the base station may send the control information in search space, and the user equipment acquires specific control information from the search space in a blind detection manner.

Further, the control information for scheduling the downlink data channel further includes a modulation and coding scheme, where the modulation and coding scheme is used to indicate a transport block size of the downlink data channel; or the control information for scheduling the uplink data channel further includes a modulation and coding scheme, where the modulation and coding scheme is used to indicate a transport block size of the uplink data channel.

Optionally, the control information further includes a modulation and coding scheme, and the resource allocation indication is used to indicate the location of the physical resource block pair that is in the downlink subframe and that is allocated to the UE, so that the UE determines a transport block size of the data channel according to the modulation and coding scheme and a quantity of physical resource block pairs carried at the location of the physical resource block pair, and receives the downlink data or sends uplink data according to the transport block size.

Alternatively, specifically, the UE searches a table according to the resource allocation indication and the modulation and coding scheme to determine a current transport block size, and finally, decodes the downlink data according to the transport block size. In this embodiment, a quantity of resource elements of the sub-physical resource block pair is consistent with a quantity of resource elements of the physical resource block pair (N1 is equal to N2, and M1 is equal to M2), and therefore, a transport block size mapping table corresponding to same physical resource block pairs may be searched according to resource allocation and a modulation and coding scheme that are of a two-dimensional sub-physical resource block pair, which can ensure that an original mapping table is used, and only a manner of searching a table is changed, thereby simplifying system design reducing implementation complexity, that is, a new transport block value and a new table do not need to be designed.

Figure 6:
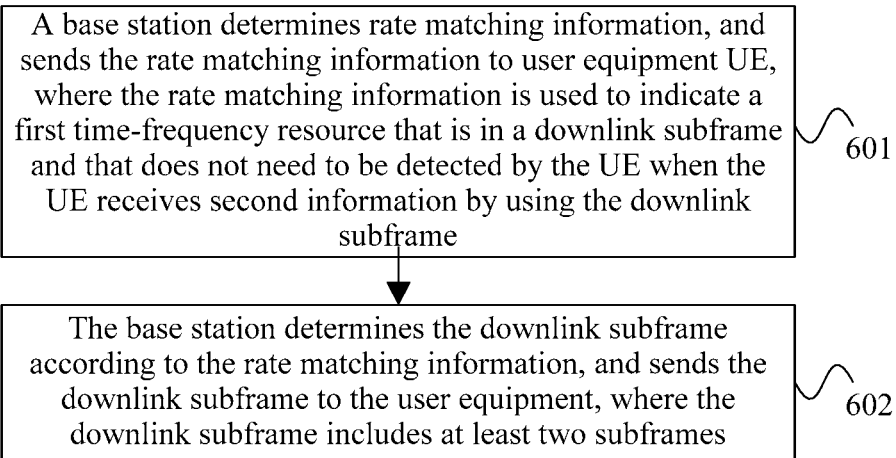
FIG. 6 is a flowchart of Embodiment 2 of an information sending method according to the present invention.

FIG. 6 is a flowchart of Embodiment 2 of an information sending method according to the present invention. As shown in FIG. 6, the information sending method provided in this embodiment of the present invention may be executed by a base station. The base station may be implemented by using software and/or hardware. The information sending method provided in this embodiment includes the following steps:

Step 601: The base station determines rate matching information, and sends the rate matching information to user equipment UE, where the rate matching information is used to indicate a first time-frequency resource that is in a downlink subframe and that does not need to be detected by the UE when the UE receives second information by using the downlink subframe.

Step 602: The base station determines the downlink subframe according to the rate matching information, and sends the downlink subframe to the user equipment, where the downlink subframe includes at least two subframes.

An application scenario of this embodiment is similar to an application scenario of the embodiment shown in FIG. 1, and details are not described herein again in this embodiment.

Specifically, when a new first time-frequency resource is introduced into an LTE system of a higher release or an LTE system of a future release, the LTE system of a higher release or the LTE system of a future release supports forward compatibility. That is, if the new first time-frequency resource is introduced into the LTE system of a higher release or the LTE system of a future release, the LTE system of a higher release or the LTE system of a future release may also provide efficient support for a UE of an old release. In this embodiment, the new first time-frequency resource is avoided by configuring rate matching information for the UE of an old release, so that the LTE system of a future release does not affect the UE of an old release, and a specific implementation process is as follows:

In step 601, the base station needs to determine the rate matching information according to an LTE release supported by the base station, a communications system architecture, or an LTE release supported by the UE, and send the rate matching information to the user equipment, where the rate matching information is used to indicate the first time-frequency resource that is in the downlink subframe and that does not need to be detected by the UE when the UE receives the second information by using the downlink subframe. A downlink subframe corresponding to the first time-frequency resource is a paging subframe or a synchronization signal sending subframe. Specifically, the base station sends the rate matching information to the UE by using layer 1 signaling or layer 2 signaling.

In step 602, the base station determines the downlink subframe according to the rate matching information, and sends the downlink subframe to the user equipment, where the downlink subframe includes at least two subframes.

According to the information sending method provided in this embodiment, a base station determines rate matching information, and sends the rate matching information to a UE, where the rate matching information is used to indicate a first time-frequency resource that is in a downlink subframe and that does not need to be detected by the UE when the UE receives second information by using the downlink subframe; and the base station determines the downlink subframe according to the rate matching information, and sends the downlink subframe to the user equipment, where the downlink subframe includes at least two subframes, so that an LTE system of a higher release or an LTE system of a future release can also provide efficient support for a UE of an old release, and an LTE communications system can efficiently and flexibly support various network architectures and various types of UEs.

Figure 7:
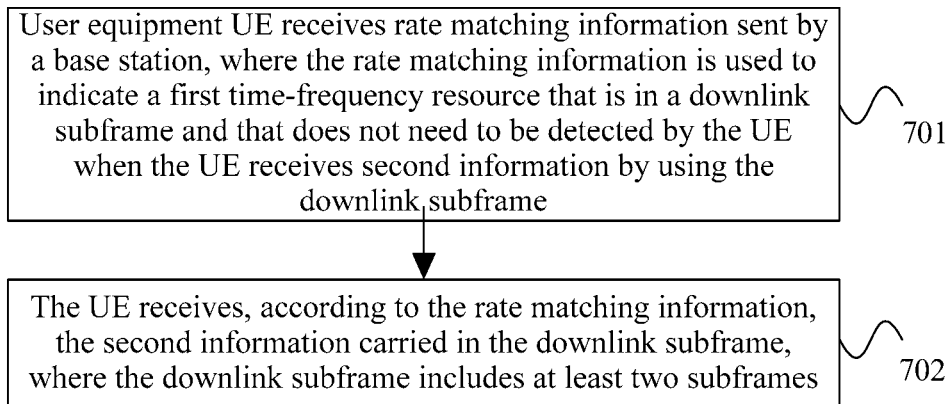
FIG. 7 is a flowchart of Embodiment 2 of an information receiving method according to the present invention.

FIG. 7 is a flowchart of Embodiment 2 of an information receiving method according to the present invention. As shown in FIG. 7, the information receiving method provided in this embodiment of the present invention may be executed by user equipment. The user equipment may be implemented by using software and/or hardware. The information receiving method provided in this embodiment includes the following steps:

Step 701: The user equipment UE receives rate matching information sent by a base station, where the rate matching information is used to indicate a first time-frequency resource that is in a downlink subframe and that does not need to be detected by the UE when the UE receives second information by using the downlink subframe.

Step 702: The UE receives, according to the rate matching information, the second information carried in the downlink subframe, where the downlink subframe includes at least two subframes.

An application scenario of this embodiment is similar to that of the embodiment shown in FIG. 6, and details are not described herein again in this embodiment.

In a specific implementation process, the UE receives, by using layer 1 signaling or layer 2 signaling, the rate matching information sent by the base station. When the downlink subframe sent by the base station is received according to the rate matching information, not all first time-frequency resources in the downlink subframe are detected, but some of the first time-frequency resources are neither detected nor received, that is, some of the first time-frequency resources are skipped. The first time-frequency resources skipped by the UE may be specifically first time-frequency resources that are not supported by an LTE release supported by the UE, and a downlink subframe corresponding to the first time-frequency resource is a paging subframe or a synchronization signal sending subframe.

According to the information receiving method provided in this embodiment, user equipment UE receives rate matching information sent by a base station, where the rate matching information is used to indicate a first time-frequency resource that is in a downlink subframe and that does not need to be detected by the UE when the UE receives second information by using the downlink subframe; and the UE receives, according to the rate matching information, the second information carried in the downlink subframe, where the downlink subframe includes at least two subframes, so that a UE of an old release can be used in an LTE system of a higher release or an LTE system of a future release, and an LTE communications system can also efficiently and flexibly support various network architectures and various types of UEs.

On a basis of the foregoing embodiments shown in FIG. 6 and FIG. 7, there are multiple possible implementation manners for the first time-frequency resource, and the multiple possible implementation manners are specifically as follows:

In a possible implementation manner, the first time-frequency resource includes all time-frequency resources included in at least one subframe.

In another possible implementation manner, the first time-frequency resource includes at least one of a physical resource block, a sub-physical resource block, a physical resource block pair, and a sub-physical resource block pair.

Optionally, a length of a time domain occupied by the sub-physical resource block pair is less than a length of a time domain occupied by one subframe, and the sub-physical resource block pair includes N1 first subcarriers and M1 first OFDM symbols, where a spacing between two adjacent first subcarriers in a frequency domain is greater than a set value, and both N1 and M1 are positive integers.

A length of a time domain occupied by the physical resource block pair is equal to a length of a time domain occupied by one subframe, and the physical resource block pair includes N2 second subcarriers and M2 second OFDM symbols, where a spacing between two adjacent second subcarriers in the frequency domain is equal to the set value, and both N2 and M2 are positive integers.

N1 is equal to N2, and M1 is equal to M2.

The physical resource block pair occupies a first frequency band, and the sub-physical resource block pair occupies a second frequency band, where the first frequency band and the second frequency band do not overlap.

For a specific implementation manner of the sub-physical resource block pair, refer to the embodiment shown in FIG. 2; for a specific implementation manner of the physical resource block pair, refer to the embodiment shown in FIG. 3.

In still another possible implementation manner, the first time-frequency resource includes at least one of a resource element, a resource element group, and a control channel element.

Specifically, the resource element is a subcarrier in an OFDM symbol, that is, a minimum resource unit; the resource element group includes several resource elements, where the several resource elements may be consecutive or inconsecutive; the control channel element is a minimum unit of a control channel, such as a physical downlink control channel (PDCCH), or an enhanced physical downlink control channel (EPDCCH), and one control channel element may include several resource element groups.

In another possible implementation manner, the first time-frequency resource includes a resource pattern of a reference signal.

Specifically, the resource pattern reference signal may be a resource occupied by a cell-specific reference signal, a channel state information-reference signal, a synchronize sequence, a UE-specific reference signal, or the like in current LTE.

On a basis of the foregoing embodiment, the base station sends a configuration message to the UE, and the UE receives the configuration message sent by the base station, where the configuration message includes at least one of uplink scheduling information, uplink power control information, and periodic uplink signal configuration information; and the UE sends an unlink signal in an uplink subframe according to the configuration message, where the uplink subframe is an uplink subframe corresponding to the downlink subframe in which the first time-frequency resource is located.

Specifically, the first time-frequency resource in the downlink subframe cannot be used by the UE, that is, the subframe needs to be skipped; however, an uplink subframe corresponding to the downlink subframe may be configured for the UE to send an uplink signal, that is, the uplink subframe and the downlink subframe are used independently, and skipping of the downlink subframe does not affect using of the uplink subframe corresponding to the downlink subframe. A correspondence herein may be a correspondence between an uplink subframe and a downlink subframe that are corresponding to a time sequence relationship between downlink data and uplink acknowledgement (Acknowledge, ACK)/negative acknowledgement (Not Acknowledge, NACK) corresponding to the downlink data, or may be an uplink subframe and a downlink subframe that are corresponding to a time sequence relationship between uplink data and downlink ACK/NACK corresponding to the uplink data, or may include a correspondence between another uplink subframe and another downlink subframe, which is not limited herein.

Figure 8:
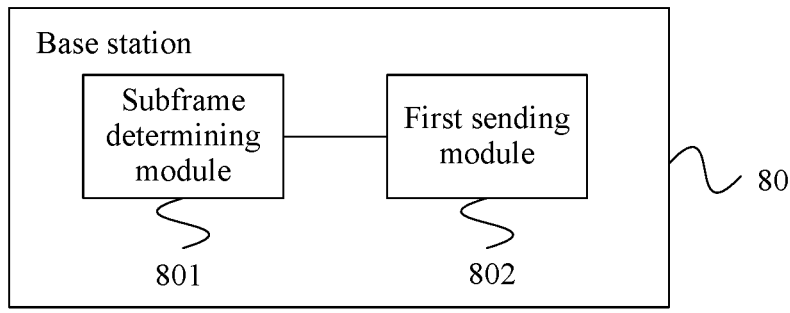
FIG. 8 is a schematic structural diagram of Embodiment 1 of a base station according to the present invention.

FIG. 8 is a schematic structural diagram of Embodiment 1 of a base station 80 according to the present invention. As shown in FIG. 8, the base station 80 provided in this embodiment of the present invention includes a subframe determining module 801 and a first sending module 802.

The subframe determining module 801 is configured to determine a downlink subframe that is used to send first information to user equipment UE.

The first sending module 802 is configured to send the first information to the UE by using the downlink subframe.

The downlink subframe is a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

The base station provided in this embodiment of the present invention may be configured to execute technical solutions of the foregoing method embodiments. Implementation principles and technical effects thereof are similar, and details are not described herein again.

Figure 9:
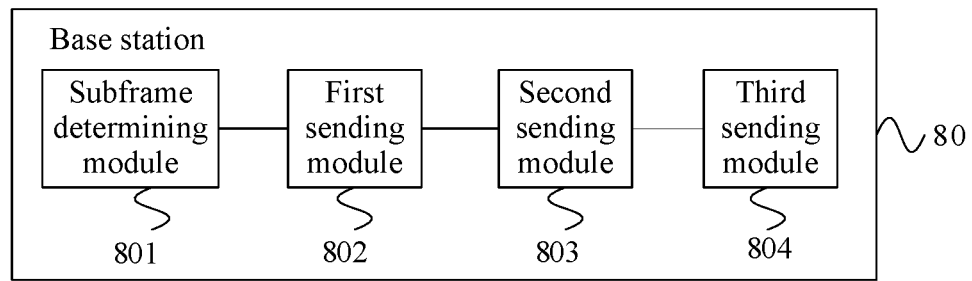
FIG. 9 is a schematic structural diagram of Embodiment 2 of a base station according to the present invention.

FIG. 9 is a schematic structural diagram of Embodiment 2 of a base station according to the present invention. As shown in FIG. 9, this embodiment is implemented on a basis of the embodiment shown in FIG. 8, and is specifically as follows:

Optionally, a length of a time domain occupied by the sub-physical resource block pair is less than a length of a time domain occupied by the first subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

Optionally, a length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

Optionally, N1 is equal to N2, and M1 is equal to M2.

Optionally, the at least one physical resource block pair in the third subframe occupies a first frequency band, and the at least one sub-physical resource block pair in the third subframe occupies a second frequency band, where the first frequency band and the second frequency band do not overlap.

Optionally, the base station 80 further includes a second sending module 803, configured to send a subframe type indication to the UE before the first information is sent to the UE by using the downlink subframe, where the subframe type indication is used to indicate that the downlink subframe is the first subframe, the second subframe, or the third subframe.

Optionally, the base station 80 further includes a third sending module 804, configured to: when the downlink subframe is the third subframe, send a frequency band indication to the UE before the first information is sent to the UE by using the downlink subframe, where the frequency band indication is used to indicate that the at least one physical resource block pair occupies the first frequency band, and the at least one sub-physical resource block pair occupies the second frequency band.

Optionally, the first sending module 802 is specifically configured to:

send the physical resource block pair on the first frequency band to the UE by using a first cyclic prefix CP length, where the physical resource block pair on the first frequency band carries the first information; or send the sub-physical resource block pair on the second frequency band to the UE by using a second CP length, where the sub-physical resource block pair on the second frequency band carries the first information, where the first CP length is different from the second CP length.

Optionally, the first information includes:

control information for scheduling a downlink data channel and downlink data carried by the downlink data channel; or control information for scheduling an uplink data channel.

Optionally, the control information for scheduling the downlink data channel includes a resource allocation indication of the downlink data channel, where the resource allocation indication of the downlink data channel is used to indicate a location of the physical resource block pair that is in the downlink subframe and that is allocated to the UE and a quantity of the physical resource block pairs, or the resource allocation indication of the downlink data channel is used to indicate a location of the sub-physical resource block pair that is in the downlink subframe and that is allocated to the UE and a quantity of the sub-physical resource block pairs.

Alternatively, the control information for scheduling the uplink data channel includes a resource allocation indication of the uplink data channel, where the resource allocation indication of the uplink data channel is used to indicate a location of the physical resource block pair that is in an uplink subframe and that is allocated to the UE and a quantity of the physical resource block pairs, or the resource allocation indication of the uplink data channel is used to indicate a location of the sub-physical resource block pair that is in an uplink subframe and that is allocated to the UE and a quantity of the sub-physical resource block pairs.

Optionally, the control information for scheduling the downlink data channel further includes a modulation and coding scheme, where the modulation and coding scheme is used to indicate a transport block size of the downlink data channel; or the control information for scheduling the uplink data channel further includes a modulation and coding scheme, where the modulation and coding scheme is used to indicate a transport block size of the uplink data channel.

The base station provided in this embodiment of the present invention may be configured to execute technical solutions of the foregoing method embodiments. Implementation principles and technical effects thereof are similar, and details are not described herein again.

Figure 10:
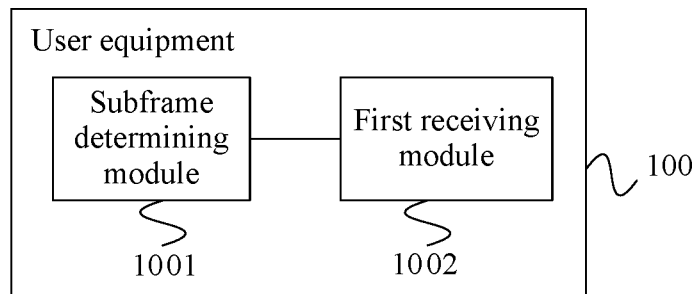
FIG. 10 is a schematic structural diagram of Embodiment 1 of user equipment according to the present invention.

FIG. 10 is a schematic structural diagram of Embodiment 1 of user equipment 100 according to the present invention. As shown in FIG. 10, the user equipment 100 provided in this embodiment of the present invention includes a subframe determining module 1001 and a first receiving module 1002.

The subframe determining module 1001 is configured to determine a downlink subframe that carries first information and that is sent by a base station.

The first receiving module 1002 is configured to receive the first information by using the downlink subframe.

The downlink subframe is any one of a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

The user equipment provided in this embodiment of the present invention may be configured to execute technical solutions of the foregoing method embodiments. Implementation principles and technical effects thereof are similar, and details are not described herein again.

Figure 11:
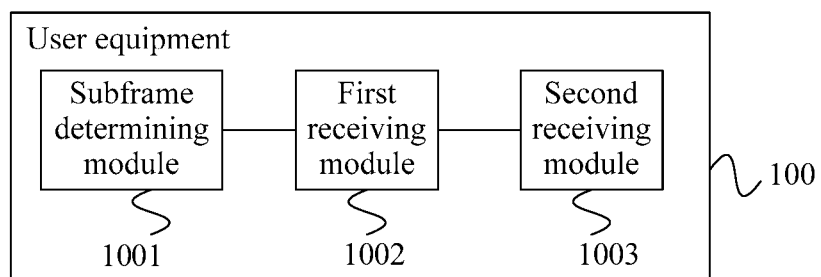
FIG. 11 is a schematic structural diagram of Embodiment 2 of user equipment according to the present invention.

FIG. 11 is a schematic structural diagram of Embodiment 2 of user equipment according to the present invention. As shown in FIG. 11, this embodiment of the present invention is implemented on a basis of the embodiment shown in FIG. 10, and is specifically as follows:

Optionally, a length of a time domain occupied by the sub-physical resource block pair is less than a length of a time domain occupied by the first subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

Optionally, a length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

Optionally, N1 is equal to N2, and M1 is equal to M2.

Optionally, the at least one physical resource block pair in the third subframe occupies a first frequency band, and the at least one sub-physical resource block pair in the third subframe occupies a second frequency band, where the first frequency band and the second frequency band do not overlap.

Optionally, the subframe determining module 1001 is specifically configured to:

receive a subframe type indication sent by the base station, where the subframe type indication is used to indicate that the downlink subframe is the first subframe, the second subframe, or the third subframe.

Optionally, the user equipment 100 further includes a second receiving module 1003, configured to: when the downlink subframe is the third subframe and before the first information is received by using the downlink subframe, receive a frequency band indication sent by the base station, where the frequency band indication is used to indicate that the at least one physical resource block pair occupies the first frequency band, and the at least one sub-physical resource block pair occupies the second frequency band.

Optionally, the first receiving module 1002 is specifically configured to:

receive the physical resource block pair that is on the first frequency band and that is sent by the base station by using a first cyclic prefix CP length, where the physical resource block pair on the first frequency band carries the first information; or receive the sub-physical resource block pair that is on the second frequency band and that is sent by the base station by using a second CP length, where the sub-physical resource block pair on the second frequency band carries the first information, where the first CP length is different from the second CP length.

Optionally, the first information includes:

control information for scheduling a downlink data channel and downlink data carried by the downlink data channel; or control information for scheduling an uplink data channel.

Optionally, the control information for scheduling the downlink data channel includes a resource allocation indication of the downlink data channel, where the resource allocation indication of the downlink data channel is used to indicate a location of the physical resource block pair that is in the downlink subframe and that is allocated to the UE and a quantity of the physical resource block pairs, or the resource allocation indication of the downlink data channel is used to indicate a location of the sub-physical resource block pair that is in the downlink subframe and that is allocated to the UE and a quantity of the sub-physical resource block pairs.

Alternatively, the control information for scheduling the uplink data channel includes a resource allocation indication of the uplink data channel, where the resource allocation indication of the uplink data channel is used to indicate a location of the physical resource block pair that is in an uplink subframe and that is allocated to the UE and a quantity of the physical resource block pairs, or the resource allocation indication of the uplink data channel is used to indicate a location and a quantity of the sub-physical resource block pairs that is in an uplink subframe and that is allocated to the UE.

Optionally, the control information for scheduling the downlink data channel further includes a modulation and coding scheme, where the modulation and coding scheme is used to indicate a transport block size of the downlink data channel; or the control information for scheduling the uplink data channel further includes a modulation and coding scheme, where the modulation and coding scheme is used to indicate a transport block size of the uplink data channel.

The user equipment provided in this embodiment of the present invention may be configured to execute technical solutions of the foregoing method embodiments. Implementation principles and technical effects thereof are similar, and details are not described herein again.

Figure 12:
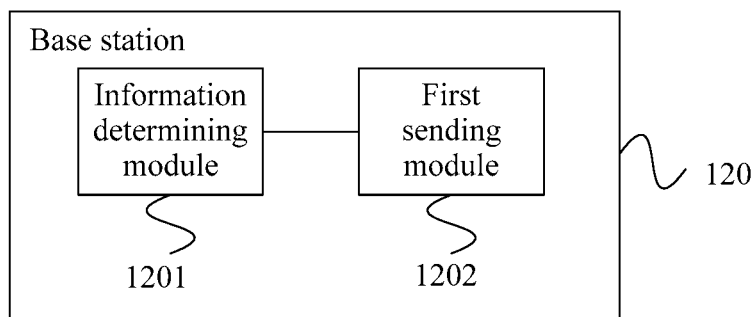
FIG. 12 is a schematic structural diagram of Embodiment 3 of a base station according to the present invention.

FIG. 12 is a schematic structural diagram of Embodiment 3 of a base station 120 according to the present invention. As shown in FIG. 12, the base station 120 provided in this embodiment of the present invention includes an information determining module 1201 and a first sending module 1202.

The information determining module 1201 is configured to determine rate matching information, and send the rate matching information to user equipment UE, where the rate matching information is used to indicate a first time-frequency resource that is in a downlink subframe and that does not need to be detected by the UE when the UE receives second information by using the downlink subframe.

The first sending module 1202 is configured to determine the downlink subframe according to the rate matching information, and send the downlink subframe to the user equipment, where the downlink subframe includes at least two subframes.

The base station provided in this embodiment of the present invention may be configured to execute technical solutions of the foregoing method embodiments. Implementation principles and technical effects thereof are similar, and details are not described herein again.

Figure 13:
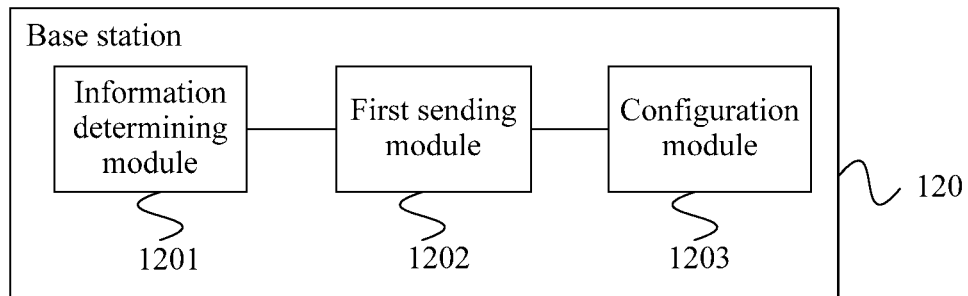
FIG. 13 is a schematic structural diagram of Embodiment 4 of a base station according to the present invention.

FIG. 13 is a schematic structural diagram of Embodiment 4 of a base station according to the present invention. As shown in FIG. 13, this embodiment of the present invention is implemented on a basis of the embodiment shown in FIG. 12, and is specifically as follows:

Optionally, the first time-frequency resource includes all time-frequency resources included in at least one subframe; or the first time-frequency resource includes at least one of a physical resource block, a sub-physical resource block, a physical resource block pair, and a sub-physical resource block pair; or the first time-frequency resource includes at least one of a resource element, a resource element group, and a control channel element; or the first time-frequency resource includes a resource pattern of a reference signal.

Optionally, a length of a time domain occupied by the sub-physical resource block pair is less than a length of a time domain occupied by one subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

Optionally, a length of a time domain occupied by the physical resource block pair is equal to a length of a time domain occupied by one subframe, and the physical resource block pair includes N2 second subcarriers and M2 second OFDM symbols, where a spacing between two adjacent second subcarriers in the frequency domain is equal to the set value, and both N2 and M2 are positive integers.

Optionally, N1 is equal to N2, and M1 is equal to M2.

Optionally, the physical resource block pair occupies a first frequency band, and the sub-physical resource block pair occupies a second frequency band, where the first frequency band and the second frequency band do not overlap.

Optionally, the first sending module 1202 is specifically configured to:

send the rate matching information to the UE by using layer 1 signaling or layer 2 signaling.

Optionally, a downlink subframe corresponding to the first time-frequency resource is a paging subframe or a synchronization signal sending subframe.

Optionally, the base station 120 further includes a configuration module 1203, configured to send a configuration message to the UE, where the configuration message includes at least one of uplink scheduling information, uplink power control information, and periodic uplink signal configuration information, and the configuration message is used to instruct the UE to send an uplink signal in an uplink subframe according to the configuration message, where the uplink subframe is an uplink subframe corresponding to the downlink subframe in which the first time-frequency resource is located.

The base station provided in this embodiment of the present invention may be configured to execute technical solutions of the foregoing method embodiments. Implementation principles and technical effects thereof are similar, and details are not described herein again.

Figure 14:
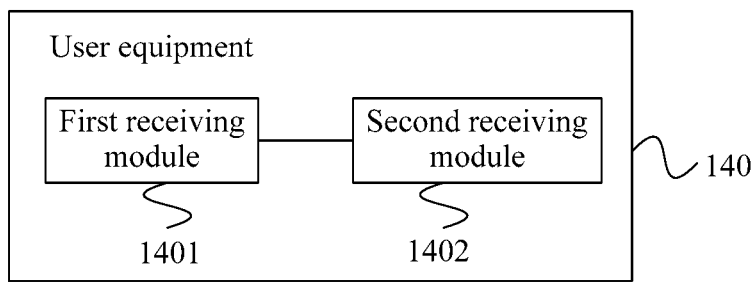
FIG. 14 is a schematic structural diagram of Embodiment 3 of user equipment according to the present invention.

FIG. 14 is a schematic structural diagram of Embodiment 3 of user equipment 140 according to the present invention. As shown in FIG. 14, the user equipment 140 provided in this embodiment of the present invention includes a first receiving module 1401 and a second receiving module 1402.

The first receiving module 1401 is configured to receive rate matching information sent by a base station, where the rate matching information is used to indicate a first time-frequency resource that is in a downlink subframe and that does not need to be detected by the UE when the UE receives second information by using the downlink subframe.

The second receiving module 1402 is configured to receive, according to the rate matching information, the second information carried in the downlink subframe, where the downlink subframe includes at least two subframes.

The user equipment provided in this embodiment of the present invention may be configured to execute technical solutions of the foregoing method embodiments. Implementation principles and technical effects thereof are similar, and details are not described herein again.

Figure 15:
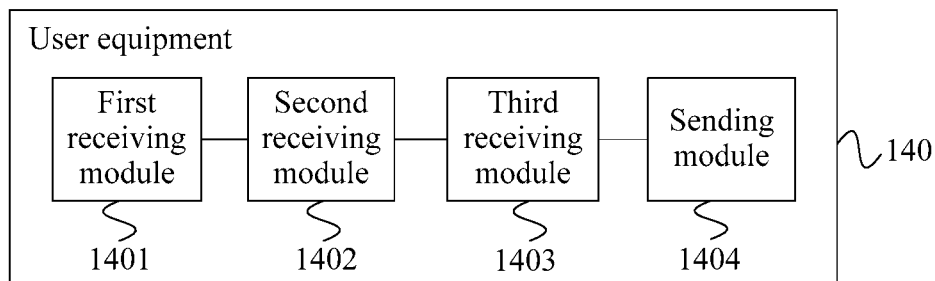
FIG. 15 is a schematic structural diagram of Embodiment 4 of user equipment according to the present invention.

FIG. 15 is a schematic structural diagram of Embodiment 4 of user equipment according to the present invention. As shown in FIG. 15, this embodiment of the present invention is implemented on a basis of the embodiment shown in FIG. 14, and is specifically as follows:

Optionally, the first time-frequency resource includes all time-frequency resources included in at least one subframe; or the first time-frequency resource includes at least one of a physical resource block, a sub-physical resource block, a physical resource block pair, and a sub-physical resource block pair; or the first time-frequency resource includes at least one of a resource element, a resource element group, and a control channel element; or the first time-frequency resource includes a resource pattern of a reference signal.

Optionally, a length of a time domain occupied by the sub-physical resource block pair is less than a length of a time domain occupied by one subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

Optionally, a length of a time domain occupied by the physical resource block pair is equal to a length of a time domain occupied by one subframe, and the physical resource block pair includes N2 second subcarriers and M2 second OFDM symbols, where a spacing between two adjacent second subcarriers in the frequency domain is equal to the set value, and both N2 and M2 are positive integers.

Optionally, N1 is equal to N2, and M1 is equal to M2.

Optionally, the physical resource block pair occupies a first frequency band, and the sub-physical resource block pair occupies a second frequency band, where the first frequency band and the second frequency band do not overlap.

Optionally, the first receiving module 1401 is specifically configured to:

receive, by using layer 1 signaling or layer 2 signaling, the rate matching information sent by the base station.

Optionally, a downlink subframe corresponding to the first time-frequency resource is a paging subframe or a synchronization signal sending subframe.

Optionally, the user equipment 140 further includes:

a third receiving module 1403, configured to receive a configuration message sent by the base station, where the configuration message includes at least one of uplink scheduling information, uplink power control information, and periodic uplink signal configuration information; and a sending module 1404, configured to send an uplink signal in an uplink subframe according to the configuration message, where the uplink subframe is an uplink subframe corresponding to the downlink subframe in which the first time-frequency resource is located.

The user equipment provided in this embodiment of the present invention may be configured to execute technical solutions of the foregoing method embodiments. Implementation principles and technical effects thereof are similar, and details are not described herein again.

Figure 16:
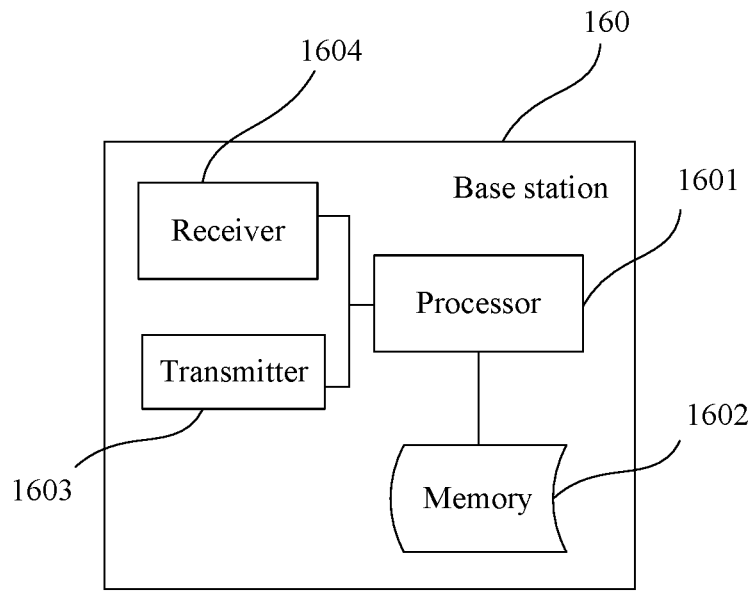
FIG. 16 is a schematic structural diagram of Embodiment 5 of a base station according to the present invention.

FIG. 16 is a schematic structural diagram of Embodiment 5 of a base station 160 according to the present invention. As shown in FIG. 16, the base station 160 provided in this embodiment includes a processor 1601 and a memory 1602. The base station 160 may further include a transmitter 1603 and a receiver 1604. The transmitter 1603 and the receiver 1604 may be connected to the processor 1601, where the transmitter 1603 is configured to send data or information, the receiver 1604 is configured to receive the data or the information, and the memory 1602 stores an execution instruction; when the base station 160 runs, the processor 1601 communicates with the memory 1602, and the processor 1601 invokes the execution instruction in the memory 1602 to perform the following operations:

determining, by the base station, a downlink subframe that is used to send first information to user equipment UE; and sending, by the base station, the first information to the UE by using the downlink subframe, where the downlink subframe is a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

Optionally, a length of a time domain occupied by the sub-physical resource block pair is less than a length of a time domain occupied by the first subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

Optionally, a length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

Optionally, N1 is equal to N2, and M1 is equal to M2.

Optionally, the at least one physical resource block pair in the third subframe occupies a first frequency band, and the at least one sub-physical resource block pair in the third subframe occupies a second frequency band, where the first frequency band and the second frequency band do not overlap.

Optionally, before the sending, by the base station, the first information to the UE by using the downlink subframe, the following operation is further included:

sending, by the base station, a subframe type indication to the UE, where the subframe type indication is used to indicate that the downlink subframe is the first subframe, the second subframe, or the third subframe.

Optionally, when the downlink subframe is the third subframe, before the sending, by the base station, the first information to the UE by using the downlink subframe, the following operation is further included:

sending, by the base station, a frequency band indication to the UE, where the frequency band indication is used to indicate that the at least one physical resource block pair occupies the first frequency band, and the at least one sub-physical resource block pair occupies the second frequency band.

Optionally, the sending, by the base station, the first information to the UE by using the downlink subframe includes:

sending, by the base station, the physical resource block pair on the first frequency band to the UE by using a first cyclic prefix CP length, where the physical resource block pair on the first frequency band carries the first information; or sending, by the base station, the sub-physical resource block pair on the second frequency band to the UE by using a second CP length, where the sub-physical resource block pair on the second frequency band carries the first information, where the first CP length is different from the second CP length.

Optionally, the first information includes:

control information for scheduling a downlink data channel and downlink data carried by the downlink data channel; or control information for scheduling an uplink data channel.

Optionally, the control information for scheduling the downlink data channel includes a resource allocation indication of the downlink data channel, where the resource allocation indication of the downlink data channel is used to indicate a location of the physical resource block pair that is in the downlink subframe and that is allocated to the UE and a quantity of the physical resource block pairs, or the resource allocation indication of the downlink data channel is used to indicate a location of the sub-physical resource block pair that is in the downlink subframe and that is allocated to the UE and a quantity of the sub-physical resource block pairs.

Alternatively, the control information for scheduling the uplink data channel includes a resource allocation indication of the uplink data channel, where the resource allocation indication of the uplink data channel is used to indicate a location of the physical resource block pair that is in an uplink subframe and that is allocated to the UE and a quantity of the physical resource block pairs, or the resource allocation indication of the uplink data channel is used to indicate a location of the sub-physical resource block pair that is in an uplink subframe and that is allocated to the UE and a quantity of the sub-physical resource block pairs.

Optionally, the control information for scheduling the downlink data channel further includes a modulation and coding scheme, where the modulation and coding scheme is used to indicate a transport block size of the downlink data channel; or the control information for scheduling the uplink data channel further includes a modulation and coding scheme, where the modulation and coding scheme is used to indicate a transport block size of the uplink data channel.

The base station provided in this embodiment of the present invention may be configured to execute technical solutions of the foregoing method embodiments. Implementation principles and technical effects thereof are similar, and details are not described herein again.

Figure 17:
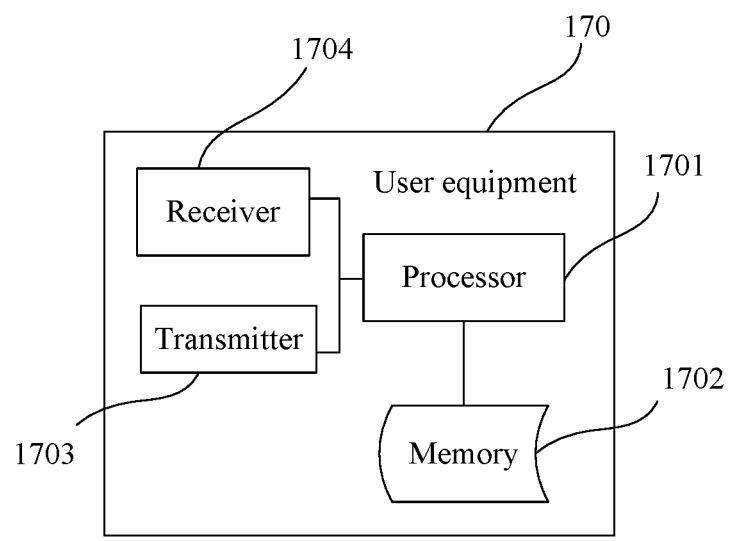
FIG. 17 is a schematic structural diagram of Embodiment 5 of user equipment according to the present invention.

FIG. 17 is a schematic structural diagram of Embodiment 5 of user equipment 170 according to the present invention. As shown in FIG. 17, the user equipment 170 provided in this embodiment includes a processor 1701 and a memory 1702. The user equipment 170 may further include a transmitter 1703 and a receiver 1704. The transmitter 1703 and the receiver 1704 may be connected to the processor 1701, where the transmitter 1703 is configured to send data or information, the receiver 1704 is configured to receive the data or the information, and the memory 1702 stores an execution instruction; when the user equipment 170 runs, the processor 1701 communicates with the memory 1702, and the processor 1701 invokes the execution instruction in the memory 1702 to perform the following operations:

determining, by the user equipment UE, a downlink subframe that carries first information and that is sent by a base station; and receiving, by the UE, the first information by using the downlink subframe, where the downlink subframe is any one of a first subframe, a second subframe, or a third subframe, where the first subframe includes at least two sub-physical resource block pairs, the second subframe includes at least two physical resource block pairs, and the third subframe includes at least one sub-physical resource block pair and at least one physical resource block pair.

Optionally, a length of a time domain occupied by the sub-physical resource block pair is less than a length of a time domain occupied by the first subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

Optionally, a length of a time domain occupied by the physical resource block pair is equal to a length of a time domain occupied by the second subframe, and the physical resource block pair includes N2 second subcarriers and M2 second OFDM symbols, where a spacing between two adjacent second subcarriers in the frequency domain is equal to the set value, and both N2 and M2 are positive integers.

Optionally, N1 is equal to N2, and M1 is equal to M2.

Optionally, the at least one physical resource block pair in the third subframe occupies a first frequency band, and the at least one sub-physical resource block pair in the third subframe occupies a second frequency band, where the first frequency band and the second frequency band do not overlap.

Optionally, the determining, by the UE, a downlink subframe that carries first information and that is sent by a base station includes:

receiving, by the UE, a subframe type indication sent by the base station, where the subframe type indication is used to indicate that the downlink subframe is the first subframe, the second subframe, or the third subframe.

Optionally, when the downlink subframe is the third subframe, before the receiving, by the UE, the first information by using the downlink subframe, the following operation is further included:

receiving, by the UE, a frequency band indication sent by the base station, where the frequency band indication is used to indicate that the at least one physical resource block pair occupies the first frequency band, and the at least one sub-physical resource block pair occupies the second frequency band.

Optionally, the receiving, by the UE, the first information by using the downlink subframe includes:

receiving, by the UE, the physical resource block pair that is on the first frequency band and that is sent by the base station by using a first cyclic prefix CP length, where the physical resource block pair on the first frequency band carries the first information; or receiving, by the UE, the sub-physical resource block pair that is on the second frequency band and that is sent by the base station by using a second CP length, where the sub-physical resource block pair on the second frequency band carries the first information, where the first CP length is different from the second CP length.

Optionally, the first information includes:

control information for scheduling a downlink data channel and downlink data carried by the downlink data channel; or control information for scheduling an uplink data channel.

Optionally, the control information for scheduling the downlink data channel includes a resource allocation indication of the downlink data channel, where the resource allocation indication of the downlink data channel is used to indicate a location of the physical resource block pair that is in the downlink subframe and that is allocated to the UE and a quantity of the physical resource block pairs, or the resource allocation indication of the downlink data channel is used to indicate a location of the sub-physical resource block pair that is in the downlink subframe and that is allocated to the UE and a quantity of the sub-physical resource block pairs.

Alternatively, the control information for scheduling the uplink data channel includes a resource allocation indication of the uplink data channel, where the resource allocation indication of the uplink data channel is used to indicate a location of the physical resource block pair that is in an uplink subframe and that is allocated to the UE and a quantity of the physical resource block pairs, or the resource allocation indication of the uplink data channel is used to indicate a location and a quantity of the sub-physical resource block pairs that is in an uplink subframe and that is allocated to the UE.

Optionally, the control information for scheduling the downlink data channel further includes a modulation and coding scheme, where the modulation and coding scheme is used to indicate a transport block size of the downlink data channel; or the control information for scheduling the uplink data channel further includes a modulation and coding scheme, where the modulation and coding scheme is used to indicate a transport block size of the uplink data channel.

The user equipment provided in this embodiment of the present invention may be configured to execute technical solutions of the foregoing method embodiments. Implementation principles and technical effects thereof are similar, and details are not described herein again.

Figure 18:
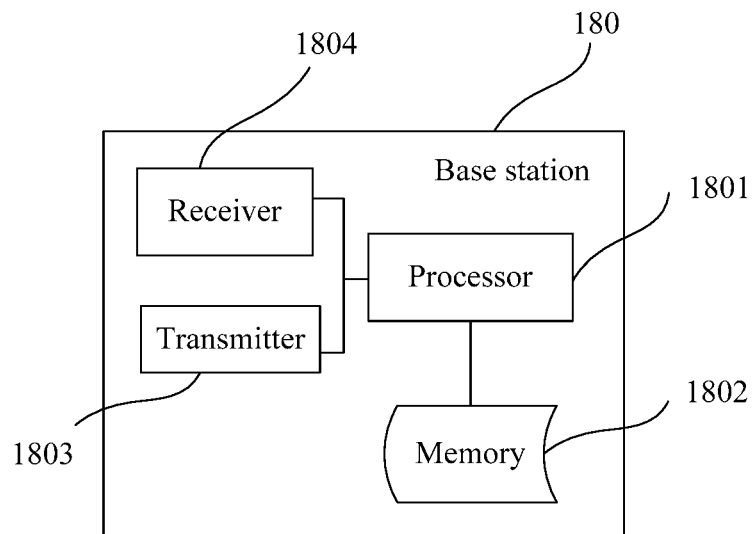
FIG. 18 is a schematic structural diagram of Embodiment 6 of a base station according to the present invention.

FIG. 18 is a schematic structural diagram of Embodiment 6 of a base station 180 according to the present invention. The base station 180 provided in this embodiment includes a processor 1801 and a memory 1802. The base station 180 may further include a transmitter 1803 and a receiver 1804. The transmitter 1803 and the receiver 1804 may be connected to the processor 1801, where the transmitter 1803 is configured to send data or information, the receiver 1804 is configured to receive the data or the information, and the memory 1802 stores an execution instruction; when the base station 180 runs, the processor 1801 communicates with the memory 1802, and the processor 1801 invokes the execution instruction in the memory 1802 to perform the following operations:

determining, by the base station, rate matching information, and sending the rate matching information to user equipment UE, where the rate matching information is used to indicate a first time-frequency resource that is in a downlink subframe and that does not need to be detected by the UE when the UE receives second information by using the downlink subframe; and determining, by the base station, the downlink subframe according to the rate matching information, and sending the downlink subframe to the user equipment, where the downlink subframe includes at least two subframes.

Optionally, the first time-frequency resource includes all time-frequency resources included in at least one subframe; or the first time-frequency resource includes at least one of a physical resource block, a sub-physical resource block, a physical resource block pair, and a sub-physical resource block pair; or the first time-frequency resource includes at least one of a resource element, a resource element group, and a control channel element; or the first time-frequency resource includes a resource pattern of a reference signal.

Optionally, a length of a time domain occupied by the sub-physical resource block pair is less than a length of a time domain occupied by one subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

Optionally, a length of a time domain occupied by the physical resource block pair is equal to a length of a time domain occupied by one subframe, and the physical resource block pair includes N2 second subcarriers and M2 second OFDM symbols, where a spacing between two adjacent second subcarriers in the frequency domain is equal to the set value, and both N2 and M2 are positive integers.

Optionally, N1 is equal to N2, and M1 is equal to M2.

Optionally, the physical resource block pair occupies a first frequency band, and the sub-physical resource block pair occupies a second frequency band, where the first frequency band and the second frequency band do not overlap.

Optionally, the sending, by the base station, the rate matching information to user equipment UE includes:

sending, by the base station, the rate matching information to the UE by using layer 1 signaling or layer 2 signaling.

Optionally, a downlink subframe corresponding to the first time-frequency resource is a paging subframe or a synchronization signal sending subframe.

Optionally, the following operation is further included:

sending, by the base station, a configuration message to the UE, where the configuration message includes at least one of uplink scheduling information, uplink power control information, and periodic uplink signal configuration information, and the configuration message is used to instruct the UE to send an uplink signal in an uplink subframe according to the configuration message, where the uplink subframe is an uplink subframe corresponding to the downlink subframe in which the first time-frequency resource is located.

The base station provided in this embodiment of the present invention may be configured to execute technical solutions of the foregoing method embodiments. Implementation principles and technical effects thereof are similar, and details are not described herein again.

Figure 19:
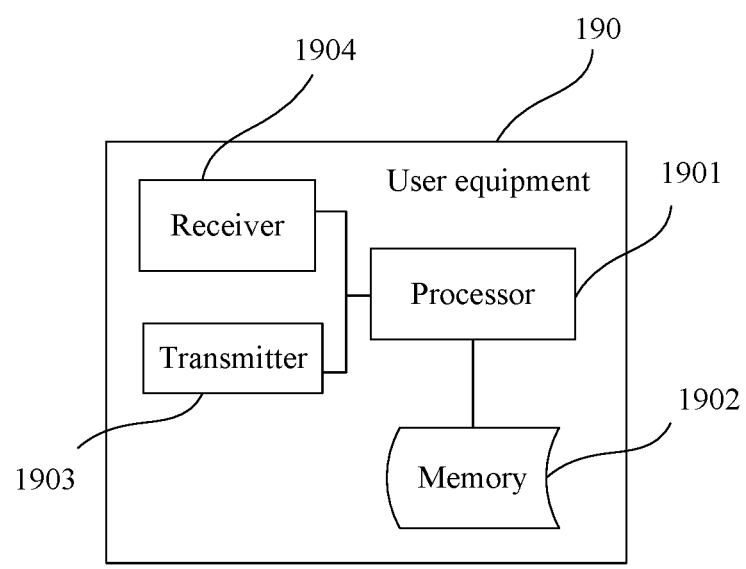
FIG. 19 is a schematic structural diagram of Embodiment 6 of user equipment according to the present invention.

FIG. 19 is a schematic structural diagram of Embodiment 6 of user equipment 190 according to the present invention. As shown in FIG. 19, the user equipment 190 provided in this embodiment includes a processor 1901 and a memory 1902. The user equipment 190 may further include a transmitter 1903 and a receiver 1904. The transmitter 1903 and the receiver 1904 may be connected to the processor 1901, where the transmitter 1903 is configured to send data or information, the receiver 1904 is configured to receive the data or the information, and the memory 1902 stores an execution instruction; when the user equipment 190 runs, the processor 1901 communicates with the memory 1902, and the processor 1901 invokes the execution instruction in the memory 1902 to perform the following operations:

receiving, by the user equipment UE, rate matching information sent by a base station, where the rate matching information is used to indicate a first time-frequency resource that is in a downlink subframe and that does not need to be detected by the UE when the UE receives second information by using the downlink subframe; and receiving, by the UE according to the rate matching information, the second information carried in the downlink subframe, where the downlink subframe includes at least two subframes.

Optionally, the first time-frequency resource includes all time-frequency resources included in at least one subframe; or the first time-frequency resource includes at least one of a physical resource block, a sub-physical resource block, a physical resource block pair, and a sub-physical resource block pair; or the first time-frequency resource includes at least one of a resource element, a resource element group, and a control channel element; or the first time-frequency resource includes a resource pattern of a reference signal.

Optionally, a length of a time domain occupied by the sub-physical resource block pair is less than a length of a time domain occupied by one subframe, and the sub-physical resource block pair includes N1 first subcarriers and M1 first orthogonal frequency division multiplexing OFDM symbols, where a spacing between two adjacent first subcarriers in a frequency domain is greater than a set value, and both N1 and M1 are positive integers.

Optionally, a length of a time domain occupied by the physical resource block pair is equal to a length of a time domain occupied by one subframe, and the physical resource block pair includes N2 second subcarriers and M2 second OFDM symbols, where a spacing between two adjacent second subcarriers in the frequency domain is equal to the set value, and both N2 and M2 are positive integers.

Optionally, N1 is equal to N2, and M1 is equal to M2.

Optionally, the physical resource block pair occupies a first frequency band, and the sub-physical resource block pair occupies a second frequency band, where the first frequency band and the second frequency band do not overlap.

Optionally, the receiving, by the user equipment UE, rate matching information sent by a base station includes:

receiving, by the UE by using layer 1 signaling or layer 2 signaling, the rate matching information sent by the base station.

Optionally, a downlink subframe corresponding to the first time-frequency resource is a paging subframe or a synchronization signal sending subframe.

Optionally, the following operation is further included:

receiving, by the UE, a configuration message sent by the base station, where the configuration message includes at least one of uplink scheduling information, uplink power control information, and periodic uplink signal configuration information; and sending, by the UE, an uplink signal in an uplink subframe according to the configuration message, where the uplink subframe is an uplink subframe corresponding to the downlink subframe in which the first time-frequency resource is located.

The user equipment provided in this embodiment of the present invention may be configured to execute technical solutions of the foregoing method embodiments. Implementation principles and technical effects thereof are similar, and details are not described herein again.

Persons of ordinary skill in the art may understand that all or some of the steps of the method embodiments may be implemented by hardware related to a program instruction. The foregoing program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An information sending method, comprising:
    sending, by a base station, a frequency band indication to a user equipment (UE), where the frequency band indication indicates that a first physical resource block occupies a first frequency band and a second physical resource block occupies a second frequency band;
    sending, by the base station, first information to the UE by using at least one of the first physical resource block or the second physical resource block, wherein
    the first physical resource block comprises N1 first subcarriers, a spacing between two adjacent first subcarriers in a frequency domain is greater than a set value, and N1 is positive integer; and
    the second physical resource block comprises N2 second subcarriers, a spacing between two adjacent second subcarriers in the frequency domain is equal to the set value, and N2 is positive integer.

2. The method according to claim 1, wherein N1=12 and N2=12.

3. The method according to claim 2, wherein the set value is 15 KHz.

4. The method according to claim 3, wherein, the sending, by the base station, first information to the UE by using at least one of the first physical resource block or the second physical resource block comprises:
    sending, by the base station, the first information to the UE by using the first physical resource block with a first cyclic prefix (CP) length; or
    sending, by the base station, the first information to the UE by using the second physical resource block with a second CP length;
    wherein the first CP length is different than the second CP length.

5. An information receiving method, comprising:
    receiving, by a user equipment (UE), a frequency band indication sent by a base station, where the frequency band indication indicates that a first physical resource block occupies a first frequency band and a second physical resource block occupies a second frequency band;

receiving, by the UE, first information by using at least one of the first physical resource block or the second physical resource block, wherein the first physical resource block comprises N1 first subcarriers, a spacing between two adjacent first subcarriers in a frequency domain is greater than a set value, and N1 is positive integer; and the second physical resource block comprises N2 second subcarriers, a spacing between two adjacent second subcarriers in the frequency domain is equal to the set value, and N2 is positive integer.

6. The method according to claim 5, wherein N1=12 and N2=12.

7. The method according to claim 6, wherein the set value is 15 KHz.

8. The method according to claim 7, wherein, the receiving, by the UE, first information by using at least one of the first physical resource block or the second physical resource block comprises:

receiving, by the UE, the first information by using the first physical resource block from the base station with a first cyclic prefix (CP) length; or receiving, by the UE, the first information by using the second physical resource block from the base station with a second CP length;

wherein the first CP length is different than the second CP length.

9. A device, comprising:
a transmitter;
at least one processor; and
one or more memories coupled to the at least one processor and storing programming instructions for execution by the at least one processor to cause the device to:
send a frequency band indication through the transmitter to a user equipment (UE), where the frequency band indication indicates that a first physical resource block occupies a first frequency band and a second physical resource block occupies a second frequency band;
send first information to the UE through the transmitter by using at least one of the first physical resource block or the second physical resource block, wherein the first physical resource block comprises N1 first subcarriers, a spacing between two adjacent first subcarriers in a frequency domain is greater than a set value, and N1 is positive integer; and
the second physical resource block comprises N2 second subcarriers, a spacing between two adjacent second subcarriers in the frequency domain is equal to the set value, and N2 is positive integer.

10. The device according to claim 9, wherein N1=12 and N2=12.

11. The device according to claim 10, wherein the set value is 15 KHz.

12. The device according to claim 11, wherein the programming instructions, when executed by the at least one processor, cause the device to:
send the first information to the UE through the transmitter by using the first physical resource block with a first cyclic prefix (CP) length or using the second physical resource block with a second CP length;
wherein the first CP length is different than the second CP length.

13. A device, comprising:
a receiver;
at least one processor; and
one or more memories coupled to the at least one processor and storing programming instructions for execution by the at least one processor to cause the device to:
receive a frequency band indication through the receiver from a base station, where the frequency band indication indicates that a first physical resource block occupies a first frequency band and a second physical resource block occupies a second frequency band;
receive first information through the receiver by using at least one of the first physical resource block or the second physical resource block, wherein the first physical resource block comprises N1 first subcarriers, a spacing between two adjacent first subcarriers in a frequency domain is greater than a set value, and N1 is positive integer; and
the second physical resource block comprises N2 second subcarriers, a spacing between two adjacent second subcarriers in the frequency domain is equal to the set value, and N2 is positive integer.

14. The device according to claim 13, wherein N1=12 and N2=12.

15. The device according to claim 14, wherein the set value is 15 KHz.

16. The device according to claim 15, wherein the programming instructions, when executed by the at least one processor, cause the device to:
receive the first information through the receiver by using the first physical resource block from the base station with a first cyclic prefix (CP) length or using the second physical resource block from the base station with a second CP length;
wherein the first CP length is different than the second CP length.

17. A non-transitory computer-readable media storing computer instructions for sending information, that when executed by one or more processors, cause the one or more processors to perform:
sending a frequency band indication to a user equipment (UE), where the frequency band indication indicates that a first physical resource block occupies a first frequency band and a second physical resource block occupies a second frequency band;
sending first information through a transmitter to the UE by using at least one of the first physical resource block or the second physical resource block, wherein the first physical resource block comprises N1 first subcarriers, a spacing between two adjacent first subcarriers in a frequency domain is greater than a set value, and N1 is positive integer; and
the second physical resource block comprises N2 second subcarriers, a spacing between two adjacent second subcarriers in the frequency domain is equal to the set value, and N2 is positive integer.

18. The non-transitory computer-readable media according to claim 17, wherein N1=12 and N2=12.

19. The non-transitory computer-readable media according to claim 18, wherein the set value is 15 KHz.

20. The non-transitory computer-readable media according to claim 19, wherein, the sending first information through a transmitter to the UE by using at least one of the first physical resource block or the second physical resource block comprises:
sending the first information through a transmitter to the UE by using the first physical resource block with a first cyclic prefix (CP) length; or sending the first information through a transmitter to the UE by using the second physical resource block with a second CP length;

wherein the first CP length is different than the second CP length.

21. A non-transitory computer-readable media storing computer instructions for sending information, that when executed by one or more processors, cause the one or more processors to perform:

receiving a frequency band indication sent by a base station, where the frequency band indication indicates that a first physical resource block occupies a first frequency band and a second physical resource block occupies a second frequency band;

receiving first information through a receiver by using at least one of the first physical resource block or the second physical resource block, wherein the first physical resource block comprises N1 first subcarriers, a spacing between two adjacent first subcarriers in a frequency domain is greater than a set value, and N1 is positive integer; and the second physical resource block comprises N2 second subcarriers, a spacing between two adjacent second subcarriers in the frequency domain is equal to the set value, and N2 is positive integer.

22. The non-transitory computer-readable media according to claim 21, wherein N1=12 and N2=12.

23. The non-transitory computer-readable media according to claim 22, wherein the set value is 15 KHz.

24. The non-transitory computer-readable media according to claim 23, wherein, the receiving first information through a receiver by using at least one of the first physical resource block or the second physical resource block comprises:

receiving the first information through a receiver by using the first physical resource block from the base station with a first cyclic prefix (CP) length; or receiving the first information through a receiver by using the second physical resource block from the base station with a second CP length;

wherein the first CP length is different than the second CP length.

* * * * *